(12) United States Patent
Xiong et al.

(10) Patent No.: US 11,051,326 B2
(45) Date of Patent: Jun. 29, 2021

(54) METHOD AND APPARATUS FOR REQUESTING UPLINK SCHEDULING IN WIRELESS COMMUNICATION SYSTEM

(71) Applicant: Samsung Electronics Co., Ltd., Suwon-si (KR)

(72) Inventors: Qi Xiong, Beijing (CN); Bin Yu, Beijing (CN); Chen Qian, Beijing (CN); Di Su, Beijing (CN); Yingjie Zhang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/476,827

(22) PCT Filed: Jan. 9, 2018

(86) PCT No.: PCT/KR2018/000421
§ 371 (c)(1),
(2) Date: Jul. 9, 2019

(87) PCT Pub. No.: WO2018/128523
PCT Pub. Date: Jul. 12, 2018

(65) Prior Publication Data
US 2019/0380139 A1    Dec. 12, 2019

(30) Foreign Application Priority Data

Jan. 9, 2017 (CN) .......... 201710014809.3
Mar. 24, 2017 (CN) .......... 201710184895.2

(51) Int. Cl.
*H04W 72/12* (2009.01)
*H04W 72/04* (2009.01)
*H04W 72/14* (2009.01)

(52) U.S. Cl.
CPC ..... *H04W 72/1268* (2013.01); *H04W 72/044* (2013.01); *H04W 72/1289* (2013.01); *H04W 72/14* (2013.01)

(58) Field of Classification Search
CPC .......... H04W 72/1268; H04W 72/044; H04W 72/1289; H04W 72/14; H04W 74/002;
(Continued)

(56) References Cited

U.S. PATENT DOCUMENTS

2009/0201868 A1    8/2009   Chun et al.
2012/0269137 A1*   10/2012   Kang .................... H04L 5/0055
                                                                   370/329
(Continued)

FOREIGN PATENT DOCUMENTS

EP    3125643 A1 *   2/2017   ......... H04B 7/15542
EP    3346628 A1 *   7/2018   .......... H04W 72/121

OTHER PUBLICATIONS

ISA/KR, "International Search Report and Written Opinion of the International Searching Authority," Application No. PCT/KR2018/000421, dated Apr. 18, 2018, 13 pages.
(Continued)

*Primary Examiner* — Ayaz R Sheikh
*Assistant Examiner* — Louis Samara

(57) ABSTRACT

The present disclosure relates to a pre-5th-Generation (5G) or 5G communication system to be provided for supporting higher data rates Beyond 4th-Generation (4G) communication system such as Long Term Evolution (LTE). The present disclosure discloses a method for responding to uplink scheduling request, user equipment and base station equipment. The method comprises: determining uplink scheduling request channel information; transmitting an uplink scheduling request signal generated according to the uplink scheduling request channel information to a base
(Continued)

station, the uplink scheduling request signal containing UE identifier information; and receiving the uplink scheduling request response signal fed back by the base station, and acquiring an uplink transmission resource grant in the uplink scheduling request response signal by using the UE identifier information. Completing an uplink scheduling request by using the contention-based random access process is optimized, and the uplink scheduling request process may lead to simple flow and high communication efficiency.

16 Claims, 16 Drawing Sheets

(58) Field of Classification Search
CPC .......... H04W 72/1284; H04W 72/1278; H04L 5/0055
See application file for complete search history.

(56) References Cited

U.S. PATENT DOCUMENTS

| | | | |
|---|---|---|---|
| 2013/0163537 A1* | 6/2013 | Anderson | H04W 72/1284 370/329 |
| 2014/0031052 A1 | 1/2014 | Lagerqvist et al. | |
| 2014/0133447 A1* | 5/2014 | Moulsley | H04W 72/1278 370/329 |
| 2015/0305065 A1* | 10/2015 | Bai | H04W 74/002 370/329 |
| 2016/0119920 A1* | 4/2016 | Mallik | H04W 72/14 370/336 |

OTHER PUBLICATIONS

Intel Corporation, "Scheduling request design for NR," R1-1611998, 3GPP TSG-RAN WG1 #87, Reno, USA, Nov. 14-18, 2016, 4 pages.

3GPP TS 36.321 V14.1.0 (Dec. 2016), Technical Specification, "3rd Generation Partnership Project; Technical Specification Group Radio Access Network; Evolved Universal Terrestrial Radio Access (E-UTRA); Medium Access Control (MAC) protocol specification (Release 14)", Dec. 2016, 98 pages.

International Telecommunication Union, "Working Document Towards a Preliminary Draft New Report ITU-R M[IMT.Beyond2020. Traffic]", Document 5D/Temp/466.5, Oct. 21, 2014, 35 pages.

International Telecommunication Union, "Future technology trends of terrestrial IMT systems," Report ITU-R M.2320-0 Nov. 2014, 32 pages.

International Telecommunication Union, "IMT Vision—Framework and overall objectives of the future development of IMT for 2020 and beyond," Recommendation ITU-R M.2083-0, Sep. 2015, 21 pages.

* cited by examiner

[Fig. 1]
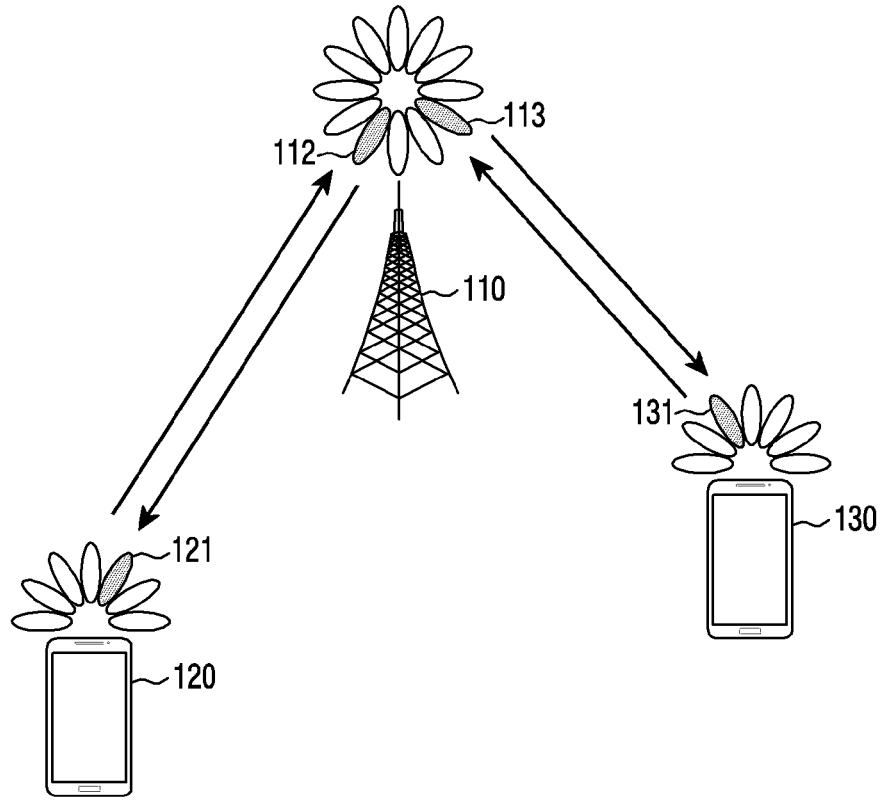
[Fig. 2]
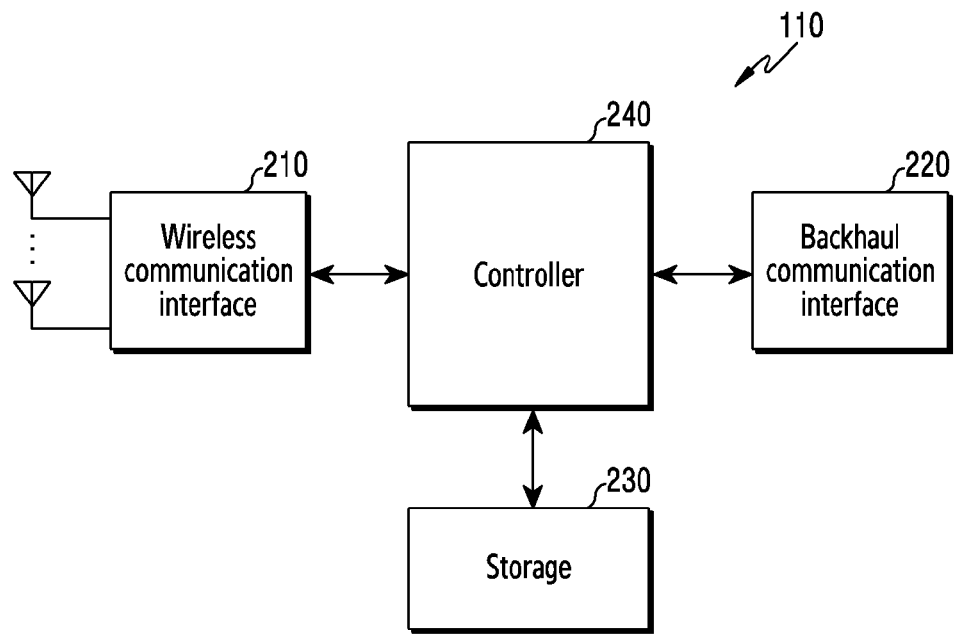

[Fig. 3]
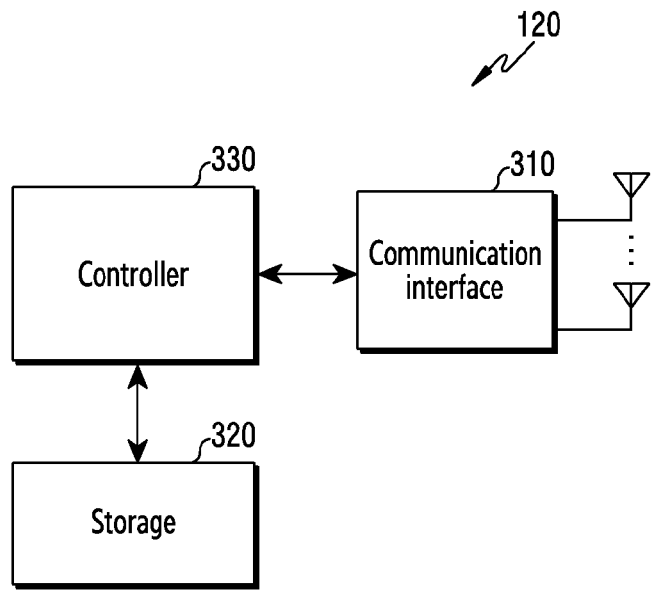
[Fig. 4]
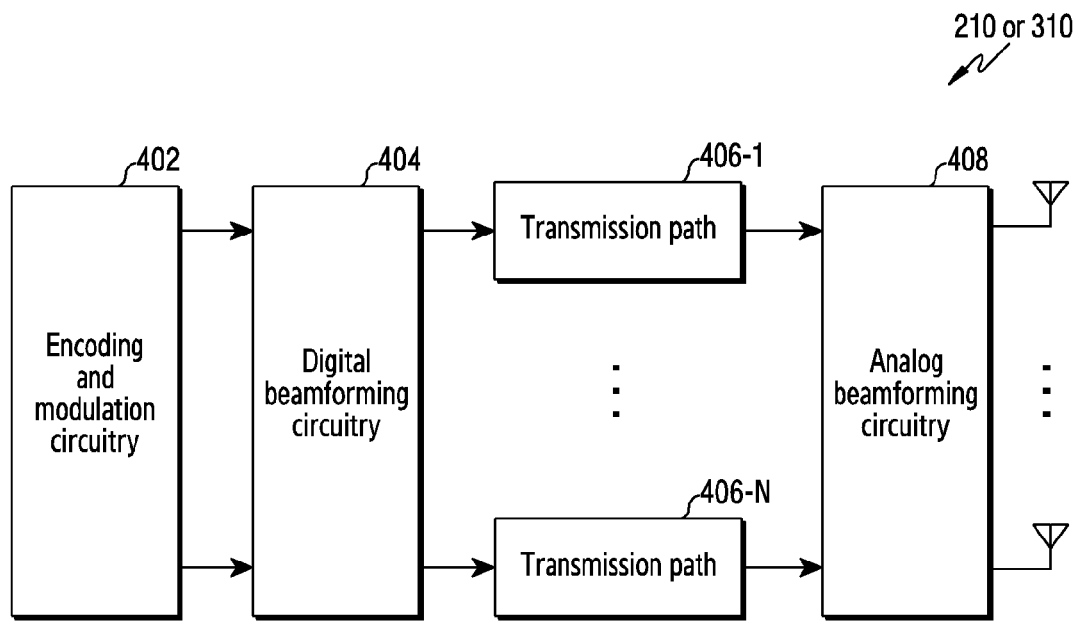

[Fig. 5]
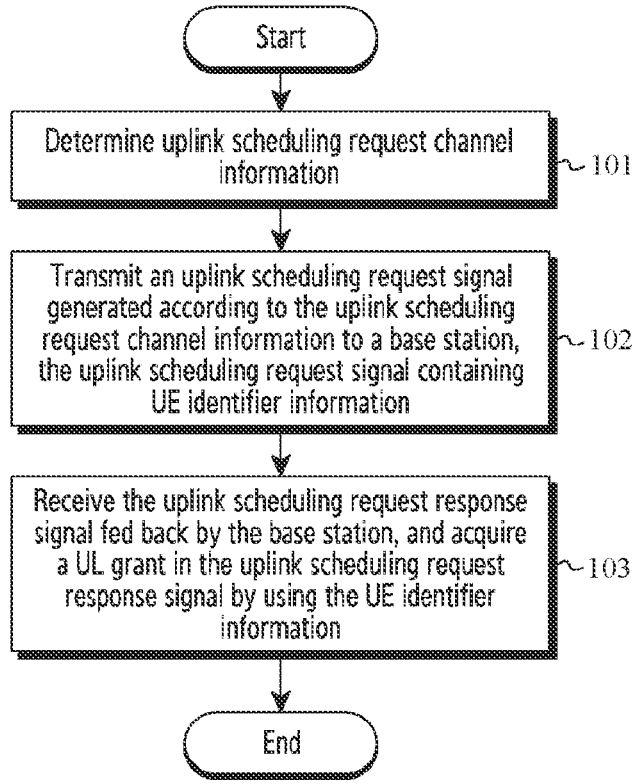
[Fig. 6]
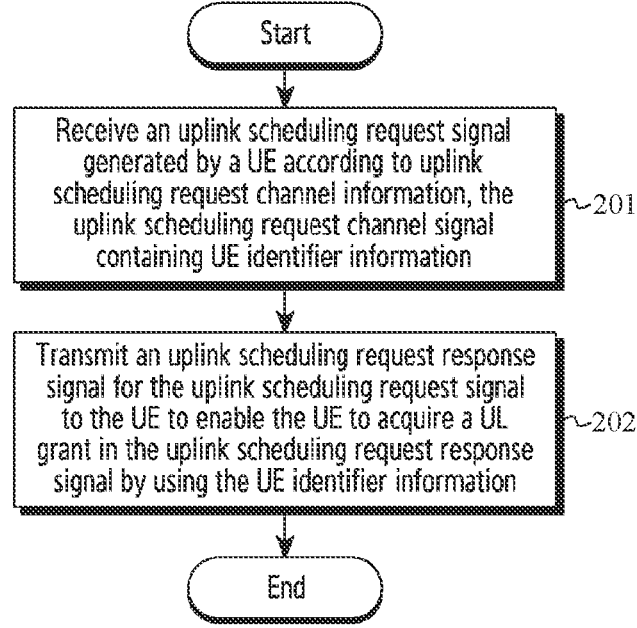

[Fig. 7]
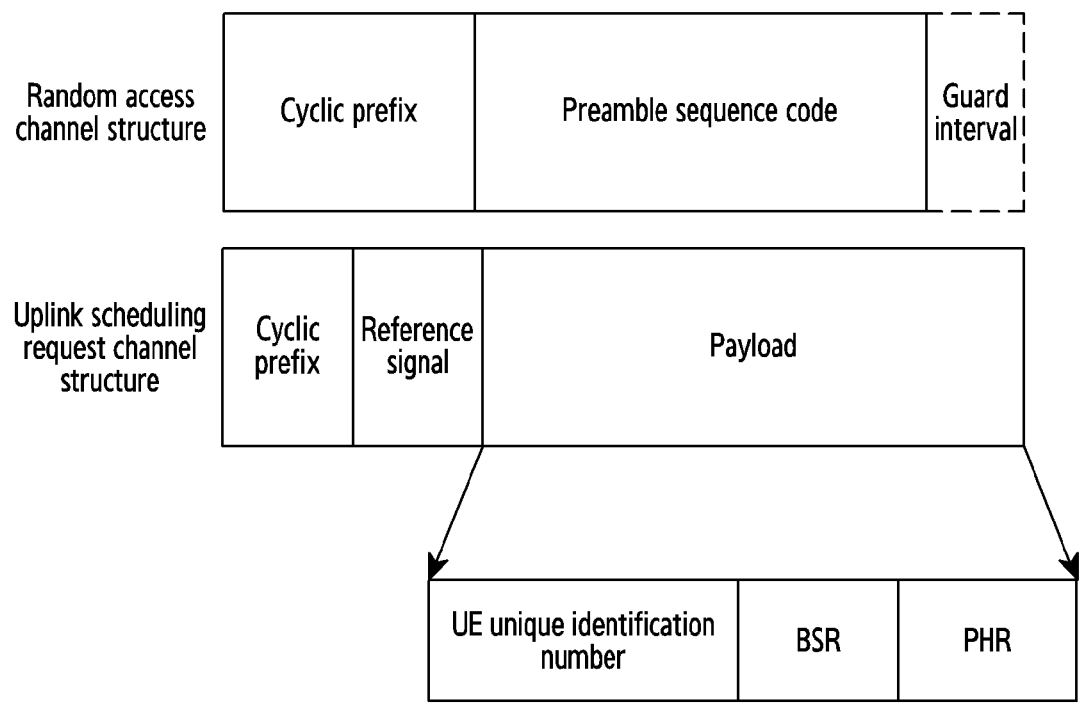
[Fig. 8]
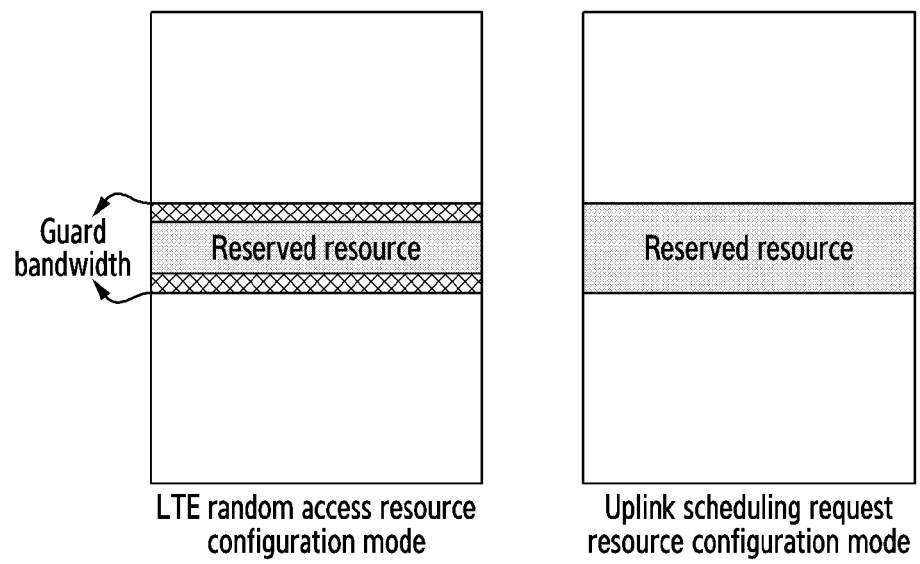

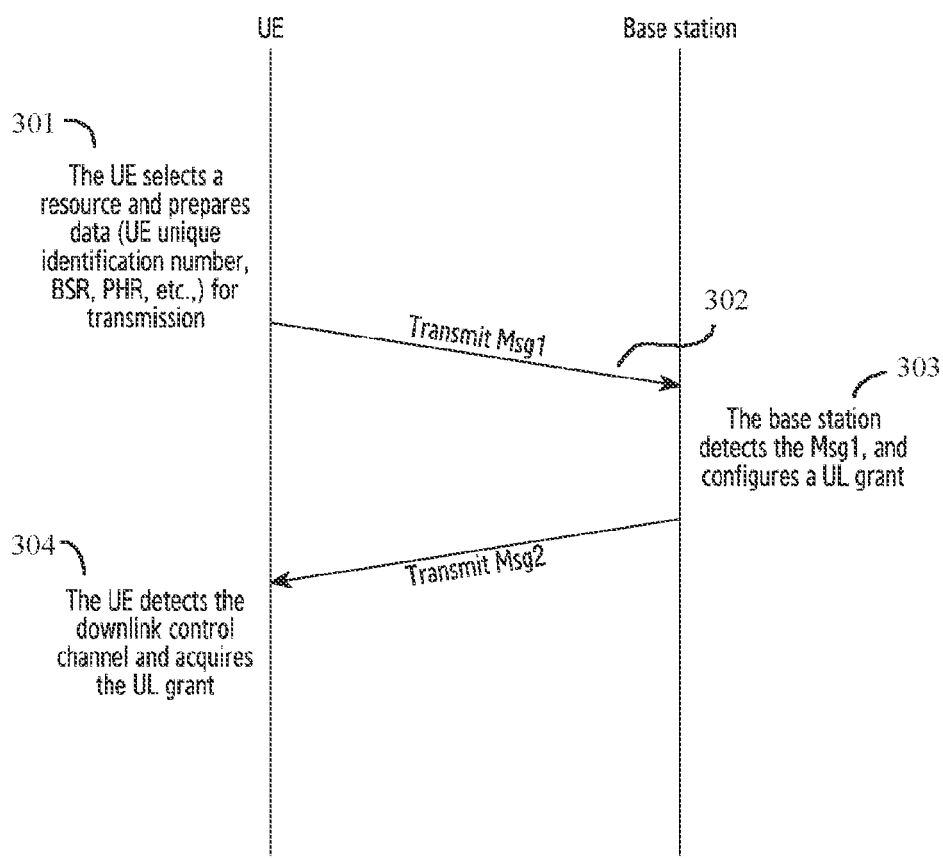

[Fig. 10]
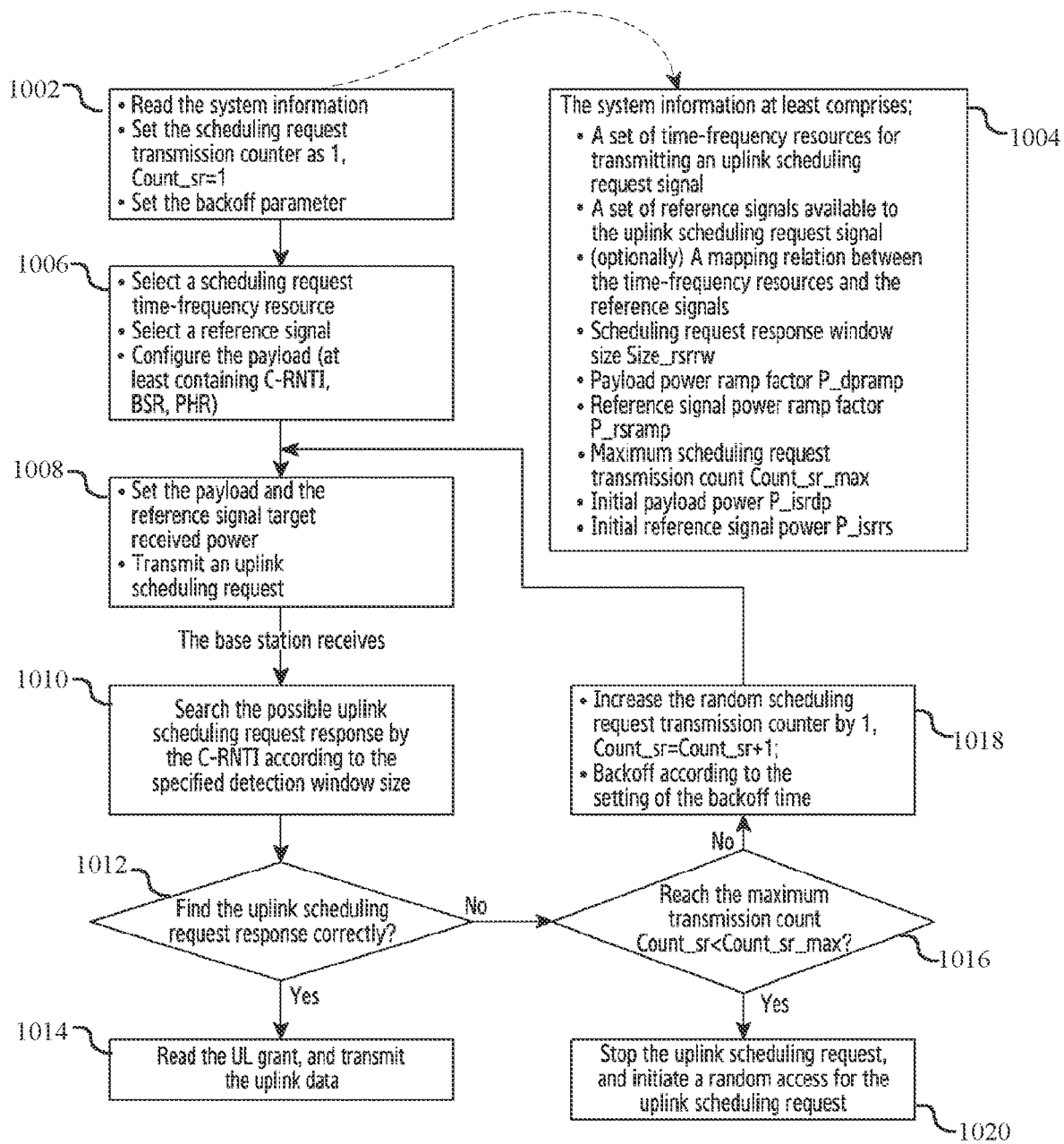

[Fig. 11]
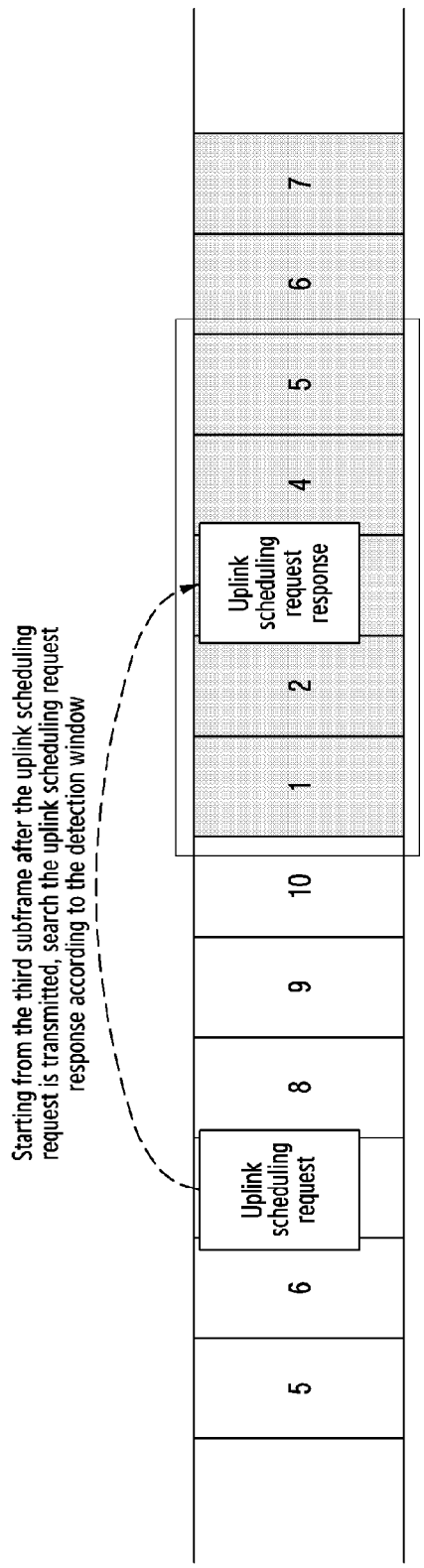

[Fig. 12]
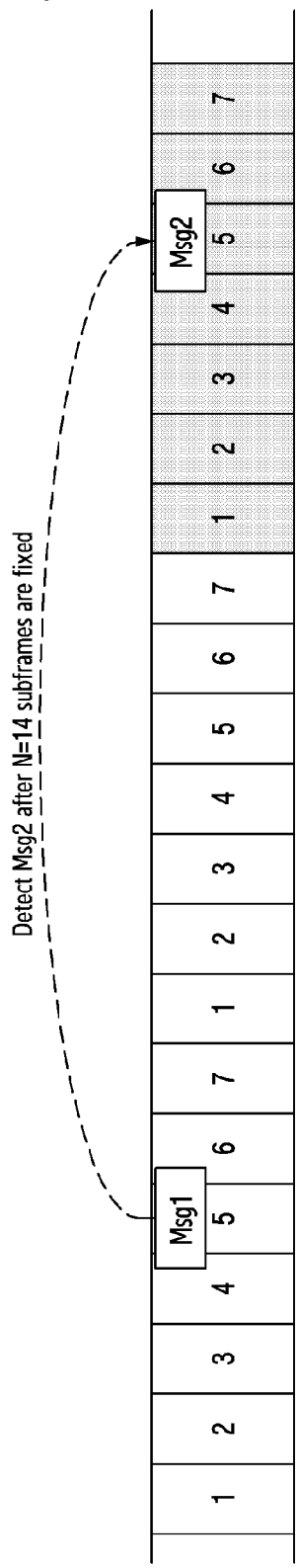

[Fig. 13]
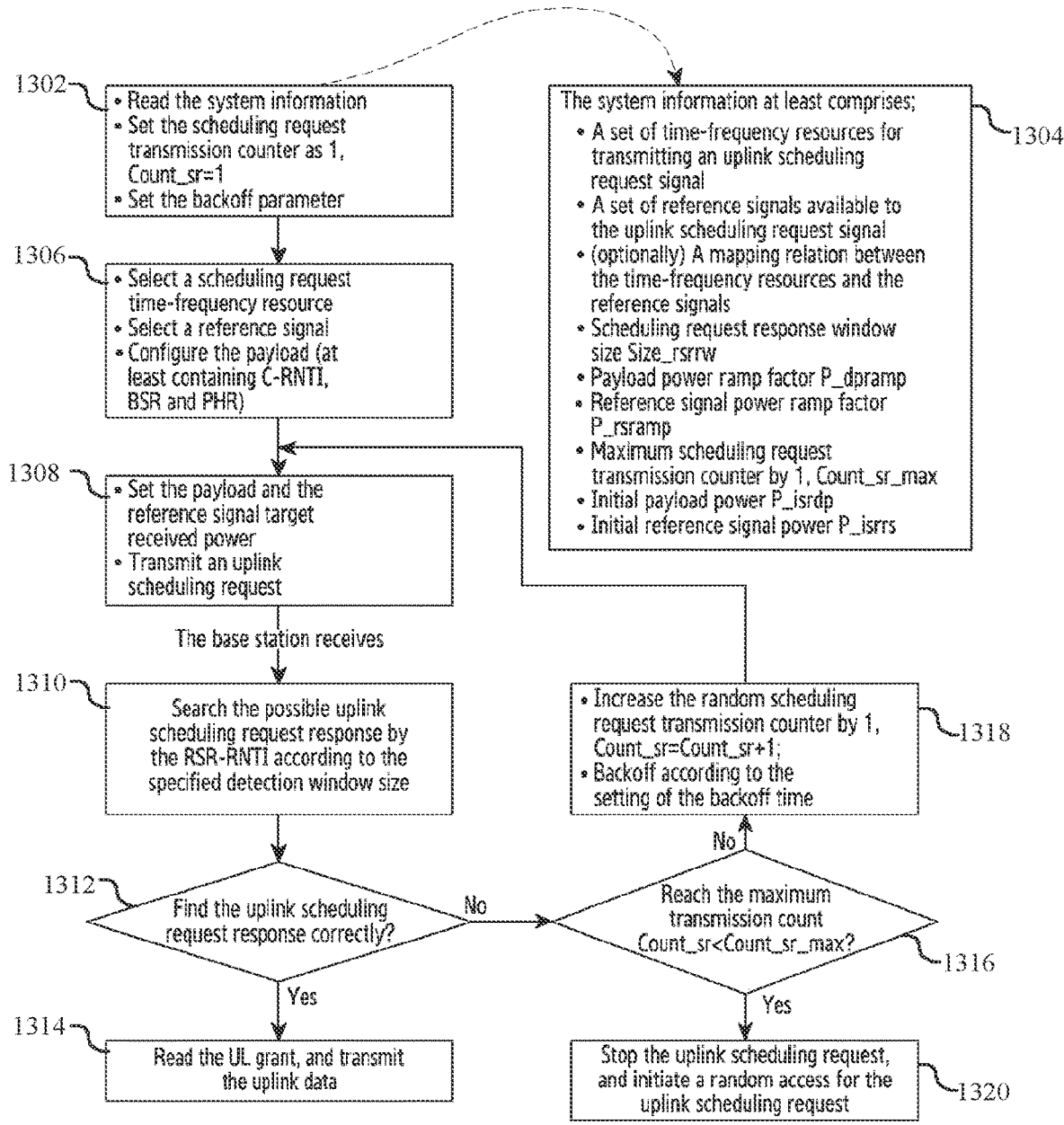

[Fig. 14]
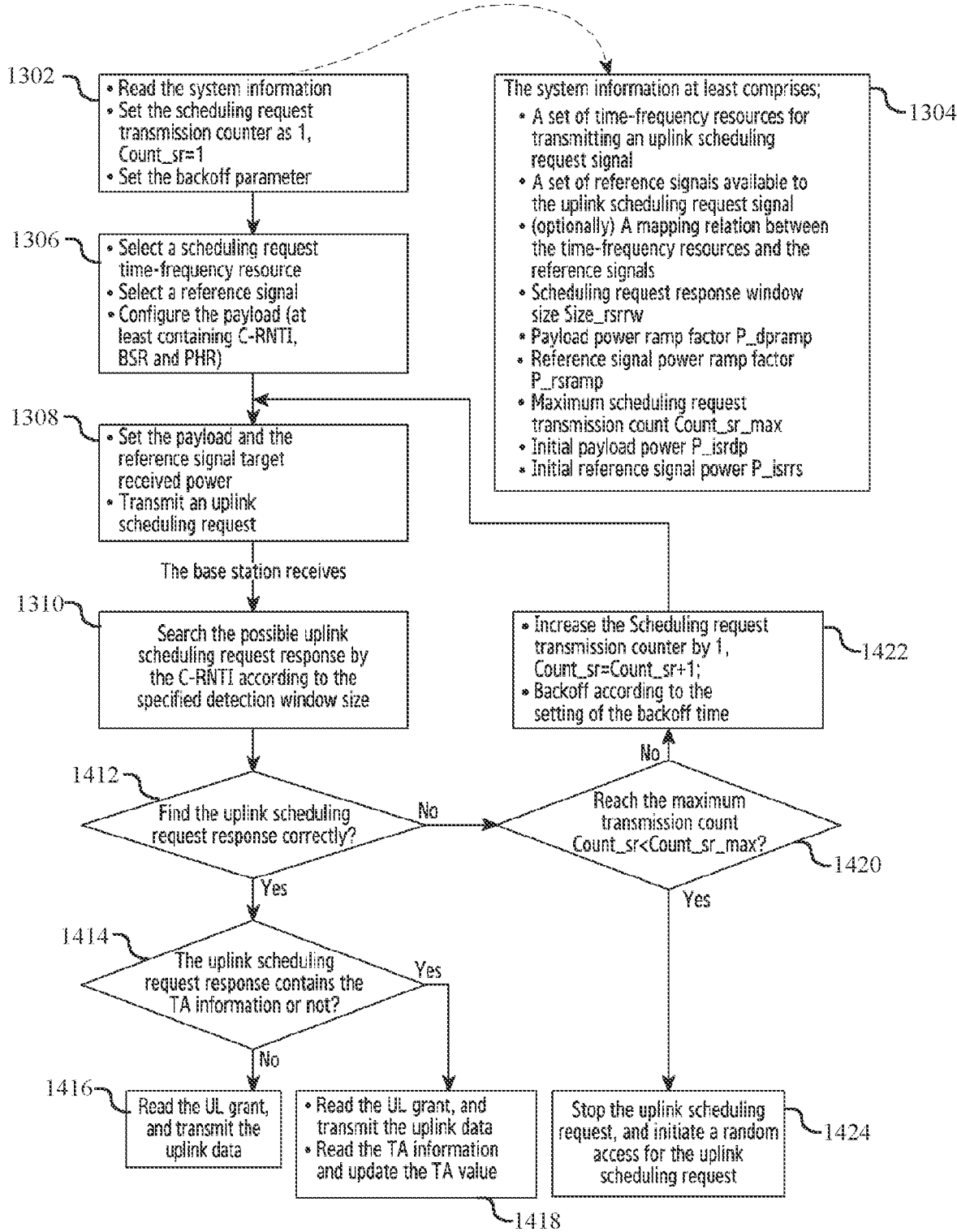

[Fig. 15]
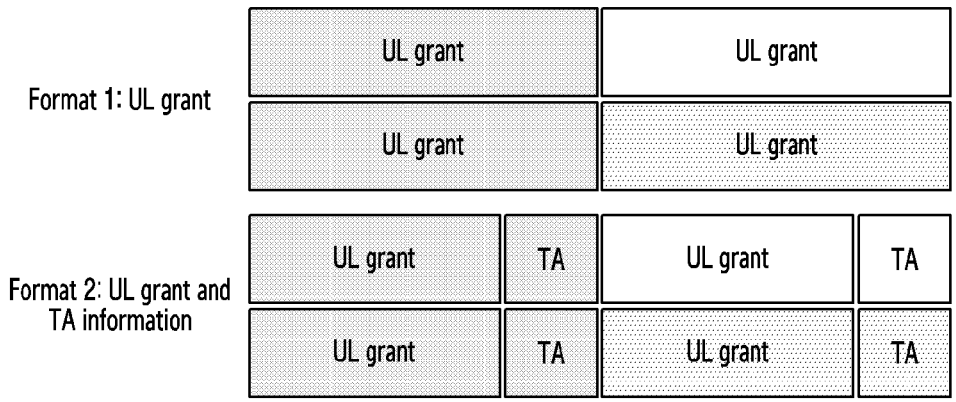
[Fig. 16]
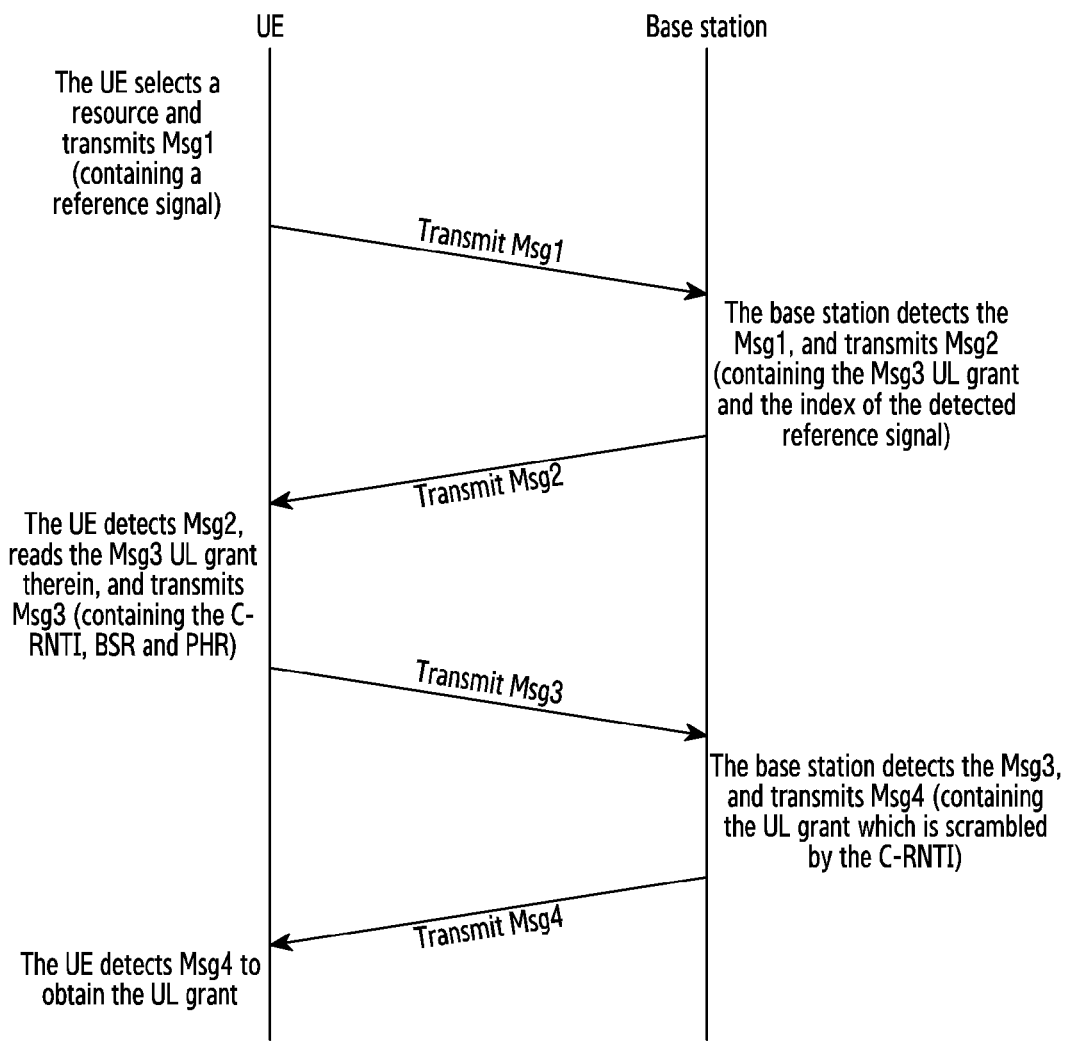

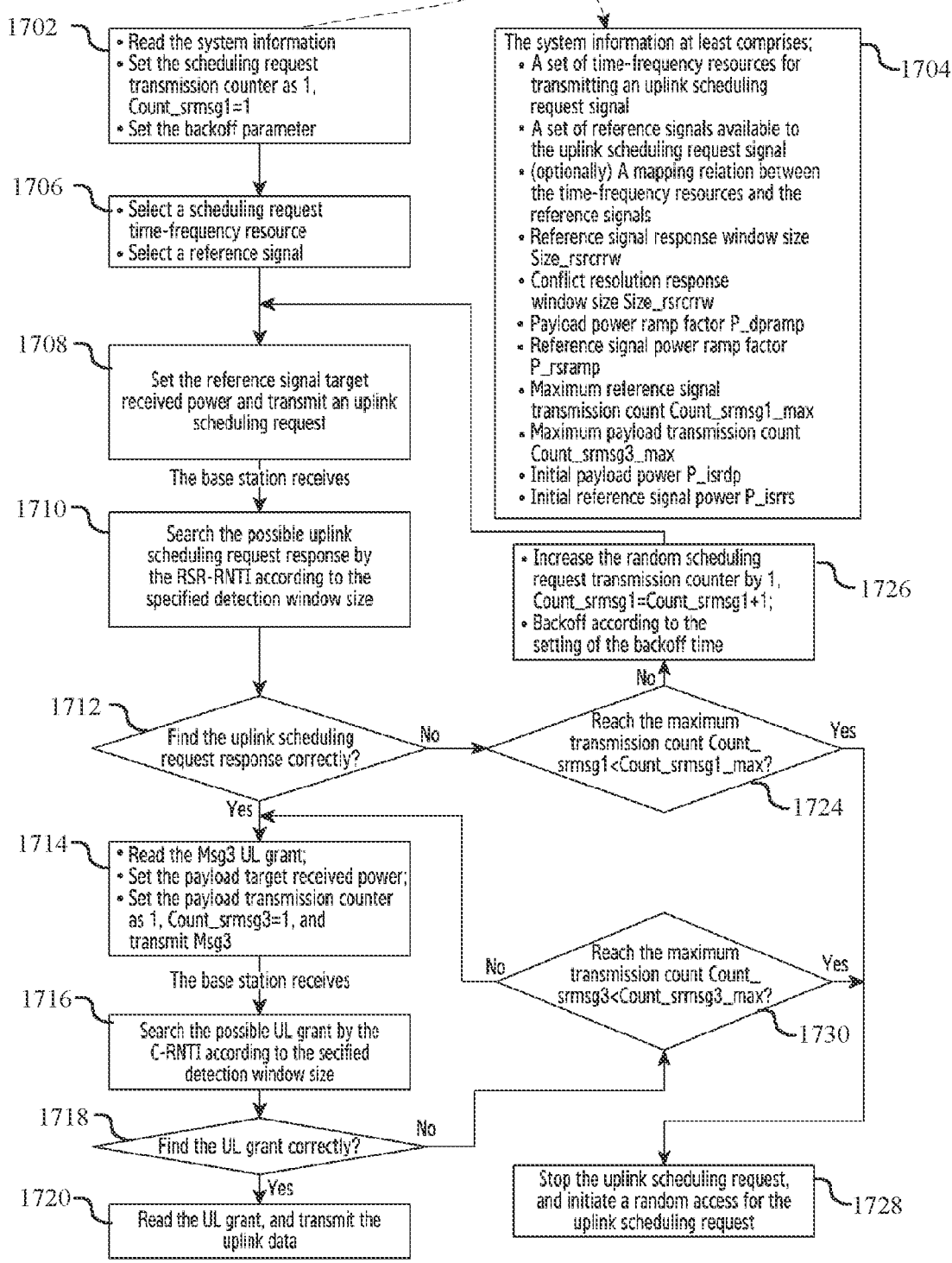

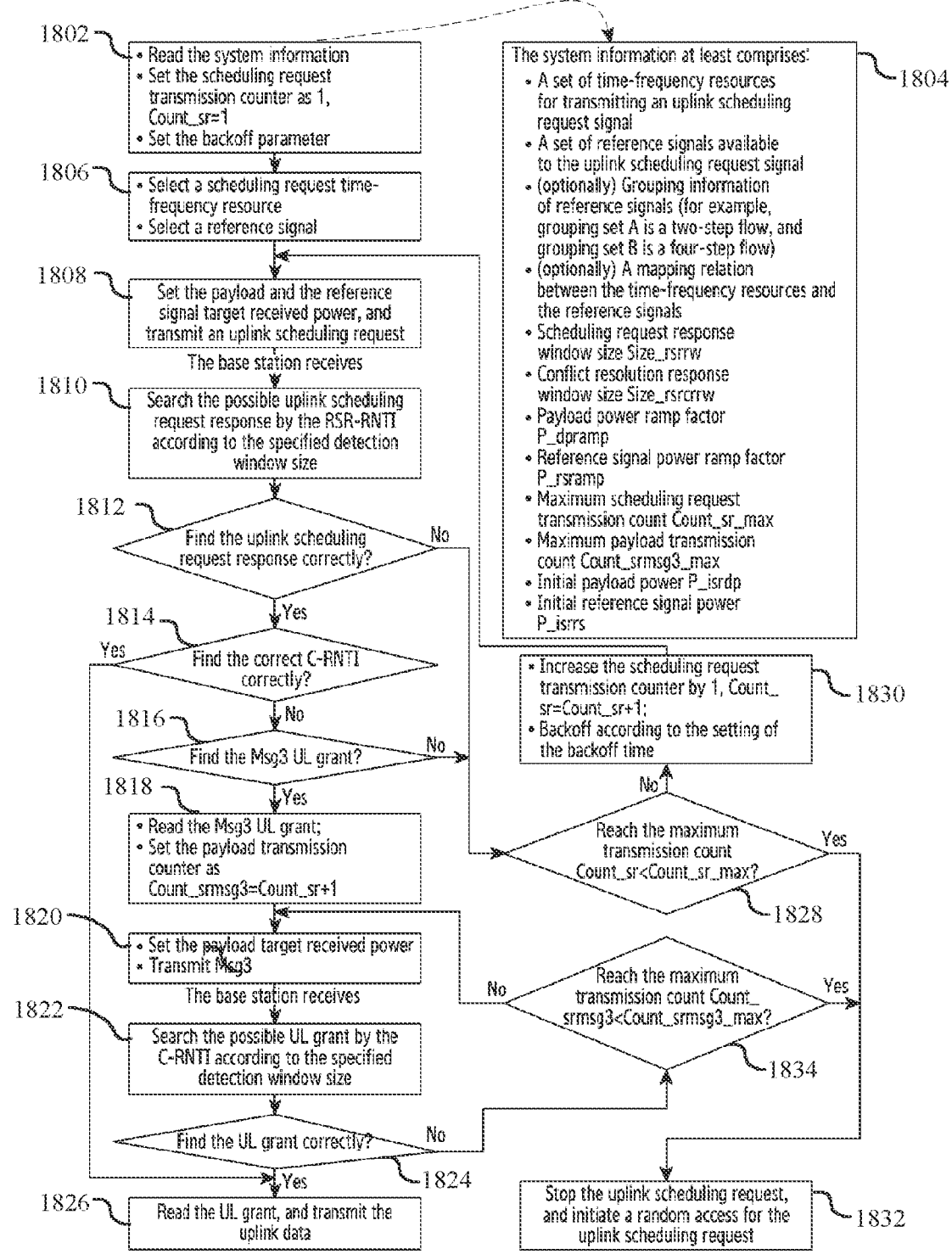

[Fig. 19]
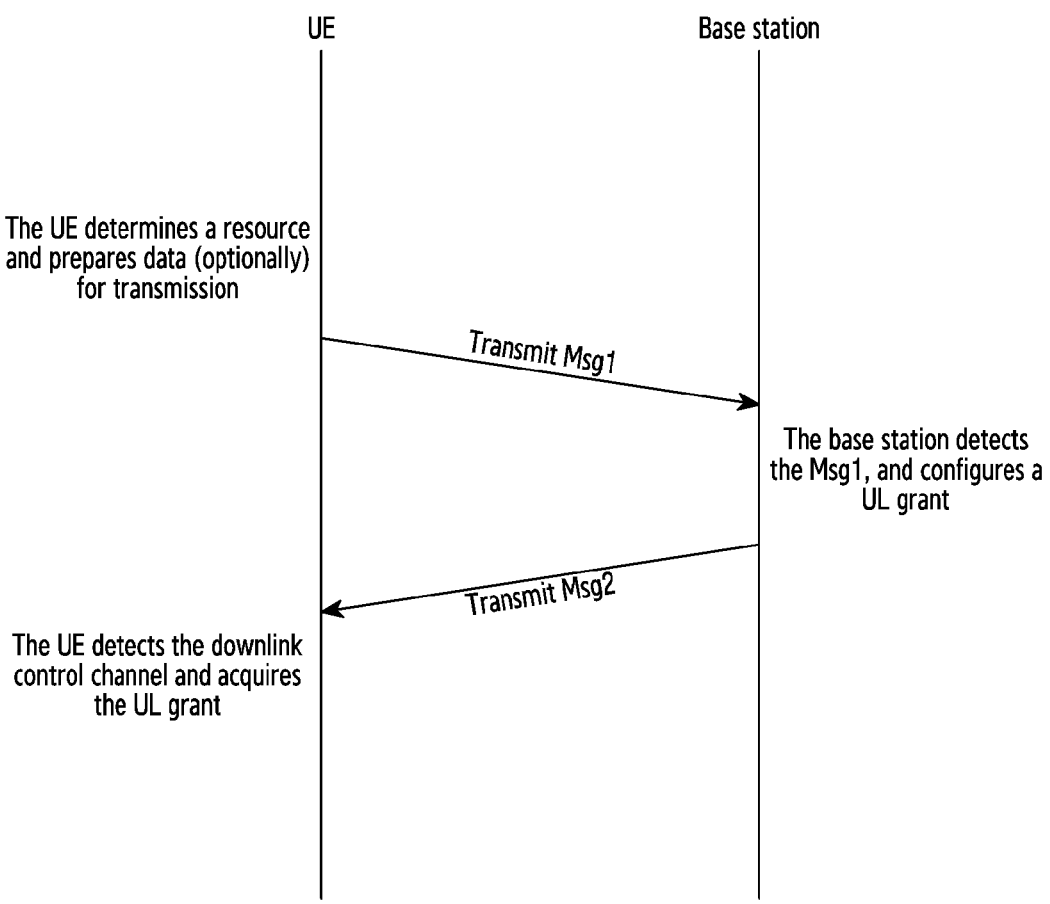

[Fig. 20]
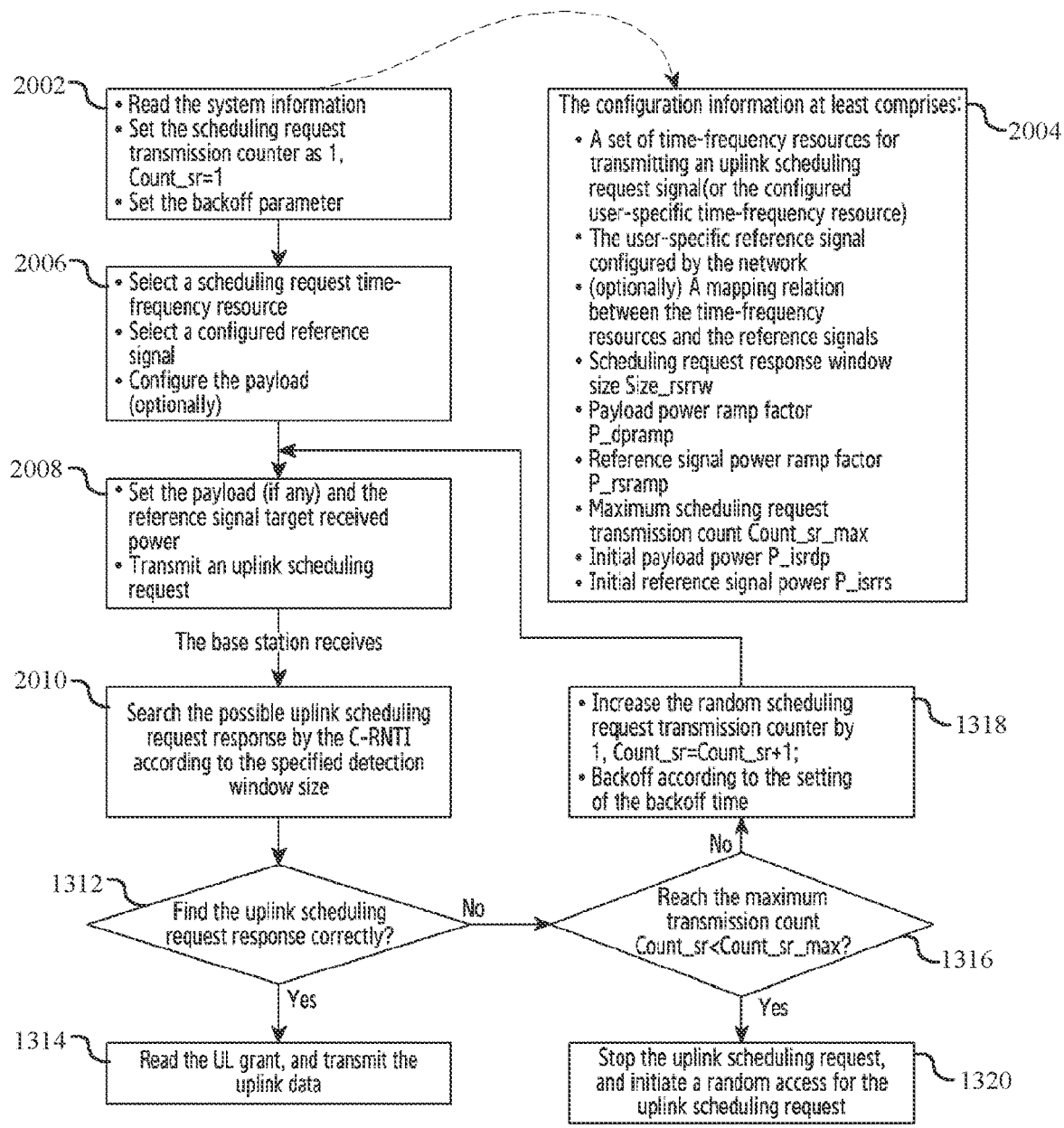
[Fig. 21]
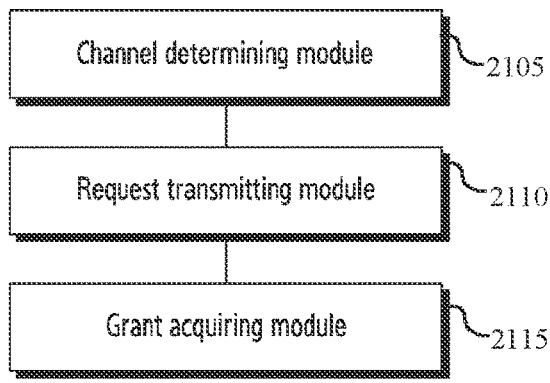

[Fig. 22]
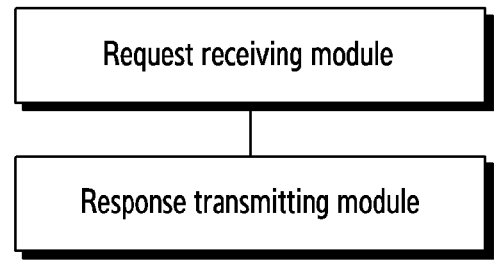

METHOD AND APPARATUS FOR REQUESTING UPLINK SCHEDULING IN WIRELESS COMMUNICATION SYSTEM

CROSS-REFERENCE TO RELATED APPLICATIONS

This application is a 371 National Stage of International Application No. PCT/KR2018/000421, filed on Jan. 9, 2018, which claims priority to Chinese Patent Application No. 201710014809.3, filed Jan. 9, 2017, and Chinese Patent Application No. 201710184895.2, filed Mar. 24, 2017, the disclosures of which are herein incorporated by reference in their entirety.

BACKGROUND

1. Field

The present disclosure relates to a wireless communication system, and in particular, to method and apparatus for uplink scheduling in wireless communication system.

2, Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvements under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like.

In the 5G system, Hybrid FSK and QAM Modulation (MI M) and sliding window superposition coding (SWSC) as an advanced coding modulation (ACM), and filter bank multi carrier (FBMC), non-orthogonal multiple access (NOMA), and sparse code multiple access (SOMA) as an advanced access technology have been developed.

In a wireless communication, user equipment (UE) and base station transmit exchanges signals. The UE transmits uplink signal to the base station, and the base station transmits downlink signal to the UE. For the UE to transmit uplink signals, UE should transmit a scheduling request (SR) to the base station. In response to the SR, the base station can provide an uplink grant to the UE. For the scheduling request, resources to transmit the scheduling request are required.

SUMMARY

An aspect of the present disclosure is to provide method and apparatus for requesting uplink scheduling in wireless communication system.

Another aspect of the present disclosure is to provide method and apparatus for achieving less signaling and interaction overhead, low latency and desired communication efficiency.

The present disclosure provides a method for requesting uplink scheduling, comprising the following steps of:
determining uplink scheduling request channel information;
transmitting an uplink scheduling request signal generated according to the uplink scheduling request channel information to a base station, the uplink scheduling request signal containing UE identifier information which is a basis for the base station to feed back an uplink scheduling request response signal; and
receiving the uplink scheduling request response signal fed back by the base station, and acquiring an uplink transmission resource grant in the uplink scheduling request response signal.

Preferably, the step of determining uplink scheduling request channel information comprises: receiving, configuration information transmitted by the base station via a Physical Broadcast Channel (PBCH) and/or a Physical Downlink Control Channel (PDCCH) and/or a Physical Downlink Shared Channel (PDSCH), and determining uplink scheduling request channel information according to a scheduling request resource in the configuration information.

Preferably, the step of acquiring an uplink transmission resource grant in the uplink scheduling request response signal comprises: parsing the uplink scheduling request response signal by using a Cell-Radio Network Temporary Identifier (C-RNTI) or S-Temporary Mobile Subscriber identity (S-TMSI) of a TIE, reading the uplink transmission resource grant in the uplink scheduling request response signal if the parsing is successful, or performing a backoff policy to acquire the uplink transmission resource grant if the parsing is failed.

Preferably, the scheduling request resource comprises a set of scheduling request signal time-frequency resources, part or all of scheduling request resources in the set of scheduling request signal time-frequency resources are determined by downlink transmission beam information.

Preferably, the scheduling request resource comprises a set of reference signals; the set of reference signals comprises a user-specific reference signal; and the uplink scheduling request signal contains the user-specific reference signal.

Preferably, the scheduling request resource further comprises a set of scheduling request signal time-frequency resources; and there is a mapping relation between the reference: signal and the scheduling request signal time-frequency resources.

Preferably, the step of determining uplink scheduling request channel information according to a scheduling request resource in network configuration information comprises:
selecting one scheduling request signal time-frequency resource from the set of scheduling request signal time-frequency resources randomly or pseudo-randomly and at an equal probability, or directly reading a scheduling request signal time-frequency resource specified by base station configuration information, which is acquired by the PDCCH, and then selecting one corresponding reference signal based on the mapping relation in which one scheduling request signal time-frequency resource corresponds to one reference signal; or selecting one reference signal from the set of reference signals randomly or pseudo-randomly and at an equal probability, or directly reading, as a reference signal, a user-specific reference signal specified by base station configuration information, which is acquired by the PDCCH, and then selecting one corresponding scheduling request signal time-frequency resource based on the mapping relation in which one reference signal corresponds to one scheduling request signal time-frequency resource; or selecting one scheduling request signal time-frequency resource from the set of scheduling request signal time-frequency resources randomly or pseudo-randomly and at an equal probability, and selecting one reference signal from M reference signals randomly or pseudo-randomly and at an equal probability based on the mapping relation in which one scheduling request signal time-frequency resource corresponds to M reference signals, wherein M is a positive integer greater than 1; or selecting one reference signal from the set of reference signals randomly or pseudo-randomly and at an equal probability, and selecting one scheduling request signal time-frequency resource from N scheduling request signal time-frequency resources randomly or pseudo-randomly and at an equal probability based on the mapping relation in which one reference signal corresponds to N scheduling request signal time-frequency resources, wherein N is a positive integer greater than 1; or selecting one scheduling request signal time-frequency resource from the set of scheduling request signal time-frequency resources randomly or pseudo-randomly and at an equal probability and selecting one reference signal from the set of reference signals randomly or pseudo-randomly and at an equal probability.

Preferably, the scheduling request resource comprises a scheduling request response window size Size_rsrrw; the step of receiving the uplink scheduling request response signal fed back by the base station comprises; receiving the uplink scheduling request response signal fed back by the base station at a downlink control channel within a subframe of a detection window defined by the scheduling request response window size Size_rsrrw, starting from the end subframe of the transmission of the uplink scheduling request signal plus a preset/con figured number of subframes.

Preferably, before the step of transmitting an uplink scheduling request signal generated according to the uplink scheduling request channel information to a base station, the method comprises: setting a scheduling request transmission counter Count_sr as 1, i.e., Count_sr=1.

Preferably, the scheduling request resource comprises an initial payload target received power P_isrdp, an initial reference signal target received power P_isrrs, a payload power ramp factor P_dpramp and a reference signal power ramp factor P_rsramp; and before the step of transmitting an uplink scheduling request signal generated according to the uplink scheduling request channel information to a base station, the method comprises;

setting a reference signal target received power P_srrs, i.e., P_srrs=P_isrrs+(Count_sr−1)*P_rsramp; and setting a payload target received power P_srdp. i.e. P_srdp=P_isrdp+(Count_sr−1)*P_dpramp.

Preferably, the uplink scheduling request channel information comprises a scheduling request signal lime-frequency resource used by the UE; the UE identifier information comprises a Cell-Radio Network Temporary Identifier (C-RNTI) of the UE;

the uplink scheduling request signal is transmitted on the scheduling request signal time-frequency resource used by the UE;

the uplink scheduling request response signal is scrambled by the base station by using a Scheduling Request-Radio Network Temporary Identifier (RSR-RNTI) obtained by calculation according to the scheduling request signal time-frequency resource used by the UE; and the step of parsing the uplink scheduling request response signal by using the UE identifier information comprises: descrambling the scheduling request response signal by using the Scheduling Request-Radio Network Temporary Identifier (RSR-RNTI) obtained by calculation according to the scheduling request signal time-frequency resource used by the UE, and comparing the Cell-Radio Network Temporary Identifier (C-RNTI) in this terminal and the C-RNTI in the scheduling request response signal.

Preferably, the step of calculating the Scheduling Request-Radio Network Temporary Identifier (RSR-RNTI) according to the scheduling request signal time-frequency resource used by the UE specifically comprises: RSR-RNTI=initial_value+x_t*t_index+x_f*f_id, where initial_value, x_t and x_f are all preset/pre-configured values, t_index denotes the subframe number of the scheduling request signal time-frequency resource, 1≤t_index≤the maximum subframe number, and f_id denotes the frequency domain number of the scheduling request signal time-frequency resource.

Preferably, the uplink scheduling request channel information comprises a scheduling request signal time-frequency resource, a reference signal, and a scheduling request signal time-frequency resource used by the UE; the UE identifier information comprises a Scheduling Request-Radio Network Temporary Identifier (RSR-RNTI);

the uplink scheduling request signal is transmitted on the scheduling request signal time-frequency resource used by the UE;

the step of receiving the uplink scheduling request response signal fed back by the base station and acquiring an uplink transmission resource grant in the uplink scheduling request response signal by using the UE identifier information specifically comprises: receiving the uplink scheduling request response signal fed back by the base station and acquiring an Msg3 uplink transmission resource grant in the uplink scheduling request response signal by using the UE identifier information; and after the step of receiving the uplink scheduling request response signal fed back by the base station and acquiring an Msg3 uplink transmission resource grant in the uplink scheduling request response signal by using the UE identifier information, the method comprises:

determining Msg3 channel information according to the Msg3 uplink transmission resource grant and the scheduling request resource;

transmitting an Msg3 signal generated according to the Msg3 channel information to the base station, the Msg3 signal containing the Cell-Radio Network Temporary Identifier (C-RNTI) of the UE; and receiving a conflict resolution signal fed back by the base station in response to the Msg3, and acquiring a UL grant in the conflict resolution signal by using Cell-Radio Network Temporary identifier (C-RNTI) of the UE.

Preferably, the step of acquiring a UL grant in the conflict resolution signal by using the Cell-Radio Network Temporary Identifier (C-RNTI) of the UE comprises: parsing the conflict resolution signal by using the Cell-Radio Network Temporary Identifier (C-RNTI) of the UE, reading the UL grant in the conflict resolution signal if the parsing is successful, or performing a backoff policy to acquire the UL grant if the parsing is failed.

Preferably, the uplink scheduling request channel consists of a cyclic prefix, a reference signal and/or a payload, and the payload comprises one or more of a Buffer Status Report (BSR), a Power Headroom Report (PHR) and the UE identifier information.

For this purpose, the present disclosure further provides a method for responding to uplink scheduling request, comprising the following steps of:

receiving an uplink scheduling request signal generated by a UE according to uplink scheduling request channel information, the uplink scheduling request channel signal containing UE identifier information; and transmitting an uplink scheduling request response signal for the uplink scheduling request signal to the UE to enable the UE to acquire an uplink transmission resource grant in the uplink scheduling request response signal.

Preferably, before the step of receiving an uplink scheduling request signal generated by a according to uplink scheduling request channel information, the method comprises: transmitting, via a Physical Broadcast Channel (PBCH) and/or a Physical Downlink Control Channel (PDCCH) and/or a Physical Downlink Shared Channel (PDSCH), configuration information to the UE to enable the HE to determine uplink scheduling request channel information according to a scheduling request resource in the configuration information.

Preferably, the step of enabling the HE to acquire an uplink transmission resource grant in the uplink scheduling request response signal by using the UE identifier information comprises: enabling the UE to parse the uplink scheduling request response signal by using a Cell-Radio Network Temporary Identifier (C-RNTI) or S-Temporary Mobile Subscriber Identity (S-TMSI) of the UE, reading by the UE the uplink transmission resource grant in the uplink scheduling request response signal if the parsing is successful, or performing by the UE a backoff policy to acquire the uplink transmission resource grant if the parsing is failed.

Preferably, the configuration information transmitted to the UE by the Downlink Control Channel (PDCCH) comprises a user-specific reference signal; and the step of transmitting an uplink scheduling request response signal for the uplink scheduling request signal to the UE comprises: determining whether the user-specific reference signal is contained in the uplink scheduling request signal, and transmitting an uplink scheduling request response signal for the uplink scheduling request signal to the UE if the user-specific reference signal is contained in the uplink scheduling request signal.

Preferably, after transmitting an uplink scheduling request response signal for the uplink scheduling request signal to the UE, the method comprises:

receiving an Msg3 signal transmitted by the TIE the Msg3 signal containing the Cell-Radio Network Temporary Identifier (C-RNTI) of the UE; and transmitting a conflict resolution signal for the Msg3 signal to the UE to enable the UE to acquire a UL grant in the conflict resolution signal by using the Cell-Radio Network Temporary Identifier (C-RNTI) of the UE.

Preferably, the step of transmitting an uplink scheduling request response signal for the uplink scheduling request signal to the UE comprises: detecting a reference signal and a payload in the received uplink scheduling request signal;

transmitting an uplink scheduling request response signal for the uplink scheduling request signal to the UE if a reference signal and a payload are detected, the uplink scheduling request response signal containing a UL grant; and transmitting an uplink scheduling request response signal for the uplink scheduling request signal to the UE if a reference signal is detected and a pay load is not detected, the uplink scheduling request response signal containing an Msg3 uplink transmission resource grant.

Preferably, the uplink scheduling request channel information further comprises a scheduling request signal time-frequency resource used by the UE;

the uplink scheduling request signal is transmitted on the scheduling request signal time-frequency resource used by the UE; and the step of transmitting an uplink scheduling request response signal for the uplink scheduling request signal to the UE comprises, calculating the Scheduling Request-Radio Network Temporary Identifier (RSR-RNTI) according to the scheduling request signal time-frequency resource used by the UE, and transmitting the uplink scheduling request response signal scrambled by the Scheduling Request-Radio Network Temporary Identifier (RSR-RNTI) to the UE.

Preferably, the step of calculating the Scheduling Request Radio Network Temporary Identifier (RSR-RNTI) according to the scheduling request signal time-frequency resource specifically comprises RSR-RNTI=initial_value+$x\_t*t\_index+x\_f*f\_id$, where initial_value, x_t and x_f are all preset/pre-configured values, t_index denotes the subframe number of the scheduling request signal time-frequency resource. $1 \le t\_index \le$ the maximum subframe number, and f_id denotes the frequency domain number of the scheduling request signal time-frequency resource.

Preferably, the uplink scheduling request channel consists of a cyclic prefix, a reference signal and a payload, and the payload comprises a Buffer Status Report (BSR), a Power Headroom Report (PHR) and the UE identifier information.

For this purpose, the present disclosure further provides an uplink scheduling request user equipment, comprising:

a channel determining module configured to determine uplink scheduling request channel information;

a request transmitting module configured to transmit an uplink scheduling request signal generated according to the uplink scheduling request channel information to a base station, the uplink scheduling request signal containing UE identifier information which is a basis for the base station to feed back an uplink scheduling request response signal; and a grant acquiring module configured to receive the uplink scheduling request response signal fed back by the base station, and acquire an uplink transmission resource grant in the uplink scheduling request response signal by using the UE identifier information.

For this purpose, the present disclosure further provides an uplink scheduling request response base station equipment, comprising:

a request receiving module configured to receive an uplink scheduling request signal generated by a UE according to uplink scheduling request channel information, the uplink scheduling request channel signal containing UE identifier information; and a response transmitting module configured to, by using the UE identifier information as a basis for a base station to feed back an uplink scheduling request response signal, transmit an uplink scheduling request response signal for the uplink scheduling request signal to the UE to enable the UE to acquire an uplink transmission resource grant in the uplink scheduling request response signal.

According to various embodiment of the present disclosure, less signaling and interaction overhead is required to request uplink scheduling, and low latency and desired communication efficiency can be achieved.

BRIEF DESCRIPTION OF THE DRAWINGS

To describe the technical solutions of the embodiments of the present disclosure more clearly, drawings to be used for the description of the embodiments will be briefly introduced below. Apparently, the drawings to be described below are merely some embodiments of the present disclosure. Other drawings may be obtained by a person of ordinary skill in the art according to those drawings without paying any creative effort.

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a flowchart of a method for requesting uplink scheduling according to the present disclosure;

FIG. 6 is a flowchart of a method for responding to uplink scheduling request according to the present disclosure;

FIG. 7 is a schematic diagram of comparison between an uplink scheduling request channel structure and a random access channel structure according to the present disclosure;

FIG. 8 is a schematic diagram of comparison between uplink scheduling request resource configuration and random access resource configuration according to the present disclosure;

FIG. 9 is a schematic diagram of communicative interaction in an uplink scheduling request process according to Embodiment 1 of the present disclosure;

FIG. 10 is a flowchart of uplink scheduling request on the UE side according to Embodiment 1 of the present disclosure;

FIG. 11 is a schematic diagram of a search mode for receiving a signal from a base station by a UE, according to Embodiment 1 of the present disclosure;

FIG. 12 is a schematic diagram of another search mode for receiving a signal from a base station by a UE, according to Embodiment 1 of the present disclosure;

FIG. 13 is a flowchart of uplink scheduling request on the UE side according to Embodiment 2 of the present disclosure;

FIG. 14 is a flowchart of uplink scheduling request on the UE side according to Embodiment 3 of the present disclosure;

FIG. 15 is a schematic diagram of comparison between two formats of an uplink scheduling request response signal, according to Embodiment 3 of the present disclosure;

FIG. 16 is a schematic diagram of communicative interaction in an uplink scheduling request process according to Embodiment 4 of the present disclosure;

FIG. 17 is a flowchart of uplink scheduling request on the UE side according to Embodiment 4 of the present disclosure;

FIG. 8 is a flowchart of uplink scheduling request on the UE side according to Embodiment 5 of the present disclosure;

FIG. 19 is a schematic diagram of communicative interaction in an uplink scheduling request process according to Embodiment 6 of the present disclosure;

FIG. 20 is a flowchart of uplink scheduling request on the UE side according to Embodiment 6 of the present disclosure;

FIG. 21 is a block diagram of modules of an uplink scheduling request user equipment according to the present disclosure; and FIG. 22 is a block diagram of modules of an uplink scheduling request response base station equipment according to the present disclosure.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for requesting uplink scheduling in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may includes request receiving module, and response transmitting module as illustrated in FIG. 22. Here, request receiving module, and response transmitting module may be a command/code temporarily resided in the controller 240, a storage space that stores the command/code, or a part of circuitry of the controller 240.

According to exemplary embodiments of the present disclosure, the controller 240 may control the wireless communication interface 210 to receive, from a user equipment (UE), a signal for requesting an uplink scheduling, the signal comprising an identifier of the UE, and generate a response signal comprising information regarding a resource grant for an uplink transmission based on the identifier of the UE. The controller 240 may also control the wireless communication interface 210 to transmit, to the UE, the response signal. For example, the controller 240 may control the base station to perform operations according to the exemplary embodiments of the present disclosure.

According to various embodiments of the present disclosure, the wireless communication interface 210 is configured to transmit, to the UE, configuration information through at least one of a physical broadcast channel (PBCH), physical downlink control channel (PDCCH), or physical downlink shared channel (PDSCH). Herein, the configuration information comprises a scheduling request resource for the signal.

According to various embodiments of the present disclosure, the configuration information comprises a user-specific reference signal. The controller 240 is configured to determine whether the user-specific reference signal is included in the signal, and the wireless communication interface 210 is configured to transmit, to the UE, the response signal if the user-specific reference signal is included in the signal.

According to various embodiments of the present disclosure, the wireless communication interface 210 is configured to receive, from the UE, a message 3 signal, the message 3 signal comprising a cell-radio network temporary identifier (C-RNTI) of the UE, and transmit a conflict resolution signal for the message 3 signal. Herein, the C-RNTI is used for the UE to acquire an uplink grant in a conflict resolution signal.

According to various embodiments of the present disclosure, the wireless communication interface 210 is configured to detect a reference signal and a payload in the received signal, transmit, to the UE, the response signal, if the reference signal and the payload are detected, the response signal comprising an uplink grant, and transmit, to the UE, the response signal, if the reference signal is detected and the payload is not detected, the response signal comprising a message 3 uplink transmission resource grant.

According to various embodiments of the present disclosure, the scheduling request resource comprises a scheduling request signal time-frequency resource for the UE, and the signal is transmitted through the scheduling request signal time-frequency resource. In this case, the controller 240 can determine a scheduling request-radio network temporary identifier (RSR-RNTI) based on the scheduling request signal time-frequency resource, and the wireless communication interface is configured to transmit, to the UE, the response signal scrambled by the RSR-RNTI.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a si a through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may include channel determining module, request transmitting module, and grant acquiring module, as illustrated in FIG. 21. Here, channel determining module, request transmitting module, and grant acquiring module may be a command/code temporarily resided in the controller 330, a storage space that stores the command/code, or a part of circuitry of the controller 330.

According to exemplary embodiments of the present disclosure, the controller 330 may generate a signal for requesting an uplink scheduling based on information regarding a channel for an uplink scheduling request, and control the communication interface 310 to transmit, to a base station, the signal comprising an identifier of the UE, and to receive, from the base station, a response signal comprising information regarding a resource grant for an uplink transmission, the resource grant corresponding to the identifier of the TIE. For example, the controller 330 may control the terminal to perform operations according to the exemplary embodiments of the present disclosure.

According to various embodiments of the present disclosure, the controller 330 can be configured to identify the resource grant based on at least one of a cell-radio network temporary identifier (C-RNTI) or system architecture evolution (SAE) temporary mobile subscriber identity (S-TMSI) of the UE, or by performing a backoff policy to acquire the resource grant.

According to various embodiments of the present disclosure, the communication interface 310 can be configured to receive, from the base station, configuration information through at least one of a physical broadcast channel (PBCH), physical downlink control channel (PDCCH), or physical downlink shared channel (PDSCH), and the controller 330 can be configured to determine the information regarding the channel for the uplink scheduling request based on a scheduling request resource in the configuration information.

According to various embodiments of the present disclosure, the scheduling request resource comprises a set of scheduling request signal time-frequency resources, at least part of the scheduling request signal time-frequency resources being determined by information regarding a downlink transmission beam, or a set of reference signals comprising a user-specific reference signal. Herein, the signal comprises the user-specific reference signal associated with the UE.

According to various embodiments of the present disclosure, at least one of the scheduling request signal time-frequency resources corresponds to at least one of the reference signals according to a mapping relation.

According to the various embodiments of the present disclosure, the information regarding the channel for the uplink scheduling request comprises a scheduling request signal time-frequency resource for the UE, and the identifier of the HE comprises a cell-radio network temporary identifier (C-RNTI) of the UE, the signal is transmitted through the scheduling request signal time-frequency resource, and the response signal is scrambled by the base station using a scheduling request-radio network temporary identifier (RSR-RNTI) which is obtained from the scheduling request signal time-frequency resource. In this case, the controller 330 can be configured to identify the resource grant by descrambling the response signal using the RSR-RNTI obtained from the scheduling request signal time-frequency resource for the HE, and comparing the C-RNTI in the UE and the C-RNTI in the response signal.

According to the various embodiments of the present disclosure, the information regarding the channel for the uplink scheduling request comprises a reference signal, and a scheduling request signal time-frequency resource for the UE, and the identifier of the UE comprises a scheduling request-radio network temporary identifier (RSR-RNTI), and the signal is transmitted on the scheduling request signal time-frequency resource used for the UE. In this case, the controller 330 can be configured to acquire a message 3 uplink transmission resource grant in the response signal by using the identifier information, determine information regarding a channel for a message 3 according to the message 3 uplink transmission resource grant and the scheduling request resource, transmit a message 3 signal generated according to the information regarding the channel for the message 3 to the base station, the message 3 signal comprising the cell-radio network temporary identifier (C-RNTI) of the UE, and receive a conflict resolution signal from the base station in response to the message 3 signal, and acquiring a uplink grant in the conflict resolution signal by using the C-RNTI of the UE.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

With the rapid development of information industry, the increasing demand from the mobile Internet and the Internet of Things (IoT) brings about unprecedented challenges in the future mobile communications technology. Extensive study of the fifth generation of mobile communications technology (5G) is being conducted in the communications industry and academia, in order to address issues such as significant improvement on system throughput, consistency of the riser experience, scalability so as to support IoT, latency, energy efficiency, cost, network flexibility, support for new services and flexible spectrum utilization.

The Random Access (RA) process is an important step for the establishment of a communication link between the user side and the network side in a radio communication system, and is used for the establishment of uplink synchronization between a User Equipment (UE) and a base station, the al location of an ID for identifying the UE by the base station to the UE, etc. The random access process can be classified into contention-based random access and contention-free random access, depending upon whether a UE exclusively occupies preamble sequence resources. For the contention-free random access, a UE uses a preamble sequence specified by the base station (i.e., exclusively occupies the preamble sequence) to transmit a random access request. For the contention-based random access, a UE does not exclusively occupy the preamble sequence resource, and each UE selects a preamble sequence from a same preamble sequence resource pool when trying to establish an uplink and uses the preamble sequence to transmit a random access request to the base station. Therefore, it is possible for a multiple of UEs to select a same preamble sequence to initiate a random access to the base station. Therefore, the conflict resolution mechanism is a key indicator influencing the random access performance.

In a random access application scenario in the LTE, there may be a case in which the UE has, in the RRC connected state, uplink data to be transmitted and there is no uplink scheduling request resource in the PUCCH (Physical Uplink Control Channel). In this case, the UE acquires an uplink transmission resource grant (i.e., an uplink scheduling request resource) from the base station by initiating a contention-based random access process. The contention-based random access process comprises four steps, i.e., the transmission of a preamble sequence, the reception of a random access response, the transmission of Msg3 and the reception of a conflict resolution. The process of acquiring an uplink scheduling request resource by a contention-based random access process by the UE is tedious, with many steps and low efficiency. The communication latency is greatly increased, and the user experience is influenced. This does not conform to the requirements of respective indexes of 5G technology.

Accordingly, it is necessary to provide an uplink scheduling request method, user equipment and base station equipment, by which the above technical problems can be solved.

Referring to FIG. 5, the method for requesting uplink scheduling in the specific implementation comprises the following steps:

a step 101 of determining uplink scheduling request channel information;

a step 102 of transmitting an uplink scheduling request signal generated according to the uplink scheduling request channel information to a base station, the uplink scheduling request signal containing UE identifier information; and a step 103 of receiving the uplink scheduling request response signal fed back by the base station, and acquiring an uplink transmission resource grant in the uplink scheduling request response signal by using the UE identifier information.

Referring to FIG. 6, the method for responding to uplink scheduling request in the specific implementation comprises the following steps:

a step 201 of receiving an uplink scheduling request signal generated by a UE according to uplink scheduling request channel information, the uplink scheduling request channel signal containing UE identifier information; and a step 202 of transmitting an uplink scheduling request response signal for the uplink scheduling request signal to the UE to enable the UE to acquire an uplink transmission resource grant in the uplink scheduling request response signal by using the UE identifier information.

The UE in the specific implementation is in the RRC connected state. In this state, the UE has uplink data to be transmitted. An uplink scheduling request is to be initiated to a serving base station for the cell so that the base station allocates an available uplink transmission resource to the UE. The structure and content of an uplink scheduling request channel are as shown in FIG. 7, including a payload, as well as a reference signal and a cyclic prefix selected by the UE. Wherein, the reference signal can use a preamble sequence code in the random access process, or a data Demodulation Reference Signal (DMRS) configured during the transmission of the uplink data. The payload is encoded from a UE unique identification number (for example, a Cell-Radio Network Temporary Identifier (C-RNTI) configured by the base station, or an S-Temporary Mobile Subscriber Identity (S-TMSI) of a UE), a Buffer State Report (BSR) and a Power Headroom Report (PHR).

Referring to FIG. 7 and FIG. 8, different from the contention-based random access channel structure, the contention-based uplink scheduling request channel structure in the specific implementation can be kept consistent with the adjacent uplink transmission channel structure in terms of parameters, for example, the use of a same sub-carrier interval, a cyclic prefix of a same length, etc. Therefore, the overhead of guard intervals can be reduced, and meanwhile, the use of guard bandwidth can be avoided and the spectrum usage of the system can be improved.

In the specific implementation, before the UE initiates an uplink scheduling request, the base station pre-configures a scheduling request resource for the UE to transmit an uplink scheduling request, contains the scheduling request resource information in network configuration information, and broadcasts to the UE by a system message. The UE selects the scheduling request resource to transmit an uplink scheduling request.

Embodiment 1

Referring to FIG. 9, a process for completing an uplink scheduling request by two communicative interaction steps by combining a method for requesting uplink scheduling in the specific implementation and a method for responding to uplink scheduling request in the specific implementation will be described below. FIG. 10 is a schematic diagram of an uplink scheduling request process on the UE side according to this embodiment.

Step 301: The UE determines uplink scheduling request channel information.

The UE selects 1002, from scheduling request resource 1004, uplink scheduling request channel information for transmitting an uplink scheduling request. The scheduling request resource 1005 comprises:

(1) A set of scheduling request signal time-frequency resources. The scheduling request signal time-frequency resources are time-frequency resources for transmitting uplink scheduling request signals. Part or all of scheduling request resources in the set of scheduling request signal time-frequency resources can be determined by downlink transmission beam information indicated by configuration information which is received by the UE in a broadcast message or PDCCH.

(2) A set of reference signals. The set of reference signals is a set of available reference signals in the uplink scheduling request signals. The reference signals can be random access preamble sequences or uplink data demodulation reference signals.

Particularly, between the reference signals and the scheduling request signal time-frequency resources, there can be the following mapping relations:

a. one scheduling request signal time-frequency resource corresponds to one reference signal;

b. one reference signal corresponds to N scheduling request signal time-frequency resources, where N is a positive integer greater than 1; and c. one scheduling request signal time-frequency resource corresponds to M reference signals, where M is a positive integer greater than 1.

Particularly, between the scheduling request signal time-frequency resources and the downlink transmission beam information, there can be the following mapping relations:

the downlink transmission beam information can be an index of a downlink transmission beam or a downlink channel or signal that can determine a downlink transmission beam:

a. one scheduling request signal time-frequency resource corresponds to one piece of downlink transmission beam information;

b. one piece of downlink transmission beam information corresponds to N' scheduling request signal time-frequency resources, where N' is a positive integer greater than 1; and c. one scheduling request signal time-frequency resource corresponds to M' pieces of downlink transmission beam information, where M' is a positive integer greater than 1.

(3) Reference signal power ramp factor P_rsramp.

(4) Payload power ramp factor P_dpramp. The payload power ramp factor and the reference signal power ramp factor can be identical, i.e., P_dpramp=P_rsramp=P_ramp.

(5) Initial reference signal target received power P_isrrs.

(6) Initial payload target received power P_isrdp. The initial payload target received power and the initial reference signal target received power can be identical, i.e., P_isrdp=P_isrrs=P_isr.

(7) Scheduling request response window size Size_rsrrw.

(8) Maximum scheduling request transmission count Count_sr_max.

(9) Backoff time set. The backoff time set may be in form of a look-up table. A backoff time index Backoff_Index is set. By constructing a table, a backoff time value Backoff_time_value is found according to the backoff time index Backoff_Index, as shown in Table 1.

TABLE 1

| Backoff time index & backoff time value | |
|---|---|
| Backoff Index | Backoff_time_value (ms) |
| 0 | 0 |
| 1 | 10 |
| 2 | 20 |
| 3 | 30 |

Step 302: The UE initializes the scheduling request process, and transmits an uplink scheduling request signal generated according to the uplink scheduling request channel information to a base station.

In the connected state, the scheduling request process is initialized by an MAC layer or an RRC layer.

A scheduling request transmission counter Count_sr is set as 1, i.e., Count_sr=1.

The backoff time index Backoff_Index is set.

The scheduling request signal time-frequency resources and the reference signals are selected 1006 in the following way.

(1) If there is a mapping relation between the scheduling request signal time-frequency resources and the reference signals, then:

a. selecting one reference signal from the set of reference signals randomly or pseudo-randomly and at an equal probability, obtaining N scheduling request signal time-frequency resources based on the mapping relation in which one reference signal corresponds to N scheduling request signal time-frequency resources, and selecting one scheduling request signal time-frequency resource from the N scheduling request al time-frequency resources randomly or pseudo-randomly and at an equal probability;

b. selecting one scheduling request signal time-frequency resource from the set of scheduling request signal time-frequency resources randomly or pseudo-randomly and at an equal probability, and obtaining M reference signals based on the mapping relation in which one scheduling request signal time-frequency resource corresponds to M reference signals, and selecting one reference signal from the M reference signals randomly or pseudo-randomly and at an equal probability;

c. selecting one reference signal from the set of reference signals randomly or pseudo-randomly and at an equal probability, and selecting one scheduling request signal time-frequency resource based on the mapping relation in which one reference signal corresponds to one scheduling request signal time-frequency resource;

d. selecting one scheduling request signal time-frequency resource from the set of scheduling request signal time-frequency resources randomly or pseudo-randomly and at an equal probability, and selecting one reference signal based on the mapping relation in which one scheduling request signal time-frequency resource corresponds to one reference signal;

e. determining a scheduling request signal time-frequency resource according to the dynamic configuration of the base station (i.e., configured by the PDCCH) (directly reading the dynamic configuration of the base station to determine a scheduling request signal time-frequency resource), or determining a scheduling request signal time-frequency resource according to the mapping relation between the downlink transmission beam information and the scheduling request signal time-frequency resources, and then selecting one reference signal based on the mapping relation in which one scheduling request signal time-frequency resource corresponds to one reference signal; and f. determining a user-specific reference signal according to the dynamic configuration of the base station (i.e., configured by the PDCCH), and selecting one scheduling request signal time-frequency resource based on the mapping relation in which one reference signal corresponds to one scheduling request signal time-frequency resource.

(2) If there is no mapping relation between the scheduling request signal time-frequency resources and the reference signals, then:

a. selecting one reference signal from the set of reference signals randomly or pseudo-randomly and at an equal probability;

b. selecting one scheduling request signal time-frequency resource from the set of scheduling request signal time-frequency resources randomly or pseudo-randomly and at an equal probability;

c. selecting a user-specific signal configured dynamically by the base station (i.e., configured by the PDCCH) as a reference signal; and d. selecting a scheduling request signal time-frequency resource configured dynamically by the base station (i.e., configured by the PDCCH) as a scheduling request signal time-frequency resource.

The payload is configured. The payload contains a UE unique identification number (for example, a C-RNTI or an S-TMSI), a BSR and a PHR.

A reference signal target received power P_srrs is set 1008, i.e., P_srrs=P_isrrs+(Count_sr−1)*P_rsramp.

A payload target received power P_srdp is set, i.e., P_srdp=P_isrdp+(Count_sr−1)*P_dpramp.

After determining the uplink scheduling request channel information such as the scheduling request signal time-frequency resource, the reference signal and the payload, the UE transmits an uplink scheduling request signal to the base station.

Step 303: The base station receives 1010 the uplink scheduling request signal transmitted by the UE, and transmits 1014 an uplink scheduling request response signal.

Since the UE selects a scheduling request signal time-frequency resource or a reference signal from the preconfigured scheduling request resources to transmit the uplink scheduling request signal, contention occurs when a multiple of UEs select a same resource.

The base station serving the cell performs blind detection and decoding in the preconfigured set of time-frequency resources, receives the uplink scheduling request signal, acquires the C-RNTI, BSR and PHR in the uplink scheduling request signal, determines a UL grant (Uplink_grant) according to the BSR and PHR, and transmits an uplink scheduling request response signal.

The uplink scheduling request response signal consists of two parts: data transmitted in the Physical Downlink Shared Channel (PDSCH), which at least comprises a UL grant, an index of the detected reference signal and timing advance information; and the time-frequency resource position information of the PDSCH transmitted in the Physical Downlink Control Channel (PDCCH), The base station scrambles the PDCCH by using the C-RNTI, and transmits the scrambled PDCCH to the UE.

Step 304: The LTE receives and decodes the uplink scheduling request response signal fed back by the base station, and acquires a UL grant in the uplink scheduling request response signal.

Referring to FIG. 11, starting from the end subframe of the transmission of the uplink scheduling request signal plus X (for example, X=3) subframes, the LTE detects whether there is any PDCCH carrying the uplink scheduling request response signal transmitted to this terminal within the configured Size_rsrrw (for example, Size_rsrrw=5) subframes. Particularly, as shown in FIG. 12, the UE searches in a frequency domain of the Xth (for example, X=14) subframe behind a subframe in which the transmission of the uplink scheduling request signal is completed, and the value of the time domain is fixed. In this embodiment, in this way of searching, the complexity for the UE to search an uplink scheduling request response signal can be decreased. Other ways of searching can also be used in other embodiments.

When detecting in the PDCCH, the UE descrambles the uplink scheduling request response signal by its own C-RNTI.

If, in block 1012, the UE descrambles and detects one uplink scheduling request response signal matched with its own C-RNTI, it stops the detection, reads the time-frequency resource position information of the PDSCH allocated by the base station, and finds the corresponding PDSCH by the time-frequency resource position information of the PDSCH so as to acquire the UL grant.

If, in block 1012, the UE does not descramble and detect an uplink scheduling request response signal matched with its own C-RNTI, the UE is failed in the contention and in this case, the UE examines, in block 1016, the scheduling request transmission counter Count_sr. If, in block 1016, Count_sr<Count_sr_max, Count_sr=Count_sr+1 is set, in block 1018, and an uplink scheduling request process is initiated again after the backoff time; and if Count_sr≥Count_sr_max, the retransmission of the uplink scheduling request is stopped, in block 1020, and a random access process is initiated for the uplink scheduling request.

The backoff time can be determined by finding the corresponding Backoff_time_value according to the set Backoff_Index, or one backoff time can be selected randomly or pseudo-randomly and at an equal probability from 0 to Backoff_time_value after the Backoff_time_value is found.

Embodiment 2

In this embodiment, another uplink scheduling request process having two communicative interaction steps will be described. FIG. 13 is a schematic diagram of an uplink scheduling request process on the UE side according to this embodiment. The difference between this embodiment and Embodiment 1 mainly lies in that the base station and the UE in Embodiment 1 scramble and descramble the uplink scheduling request response signal by the C-RNTI in block 1010, while in this embodiment, the base station and the UE scramble and descramble the uplink scheduling request response signal by the RSR-RNTI (a kind of UE identifier information) in block 1310. The same parts in this embodiment as those in Embodiment 1 will not be repeated here.

Step 401: The UE determines 1302 uplink scheduling request channel information.

In addition to the content described in the step 301, the scheduling request resource 1304 further comprises values of initial_value, x_t and x_f, which are required for calculating the RSR-RNTI, where initial_value, x_t and x_f are all preset/pre-configured values, for example, initial_value=1, x_t=1, x_f=10.

Step 402: The UE initializes the scheduling request process in block 1306, and transmits in block 1308 an uplink scheduling request signal generated according to the uplink scheduling request channel information to a base station.

The payload is configured in block 1306. The payload contains a UE unique identification number (for example, a C-RNTI or an S-TMSI), a BSR and a PHR.

Step 403: The base station, in block 1310, receives the uplink scheduling request signal transmitted by the UE, and transmits an uplink scheduling request response signal.

The base station serving the cell performs blind detection and decoding in the preconfigured set of time-frequency resources, receives the uplink scheduling request signal, acquires the BSR and PHR in the uplink scheduling request signal, determines a UL grant (Uplink_grant) according to the BSR and PHR, and transmits an uplink scheduling request response signal.

The base station calculates the RSR-RNTI according to the time-frequency resource where the received uplink scheduling request signal is located (i.e., the scheduling request signal time-frequency resource selected by the UE), i.e., RSR-RNTI=initial_value+x_t*t_index+x_f*f_id, where t_index denotes the subframe number of the scheduling request signal time-frequency resource, 1≤t_index≤the maximum subframe number, and f_id denotes the frequency domain number of the scheduling request signal time-frequency resource.

The uplink scheduling request response signal consists of two parts: data transmitted in the PDSCH, which at least comprises a UL grant, an index of the detected reference signal and timing advance information; and the time-frequency resource position information of the PDSCH transmitted in the PDCCH. The base station allocates a PDSCH, and scrambles the PDCCH by the calculated RSR-RNTI and then transmits the scrambled PDCCH to the UE.

Step 404: The LE receives and decodes the uplink scheduling request response signal fed back by the base station and acquires a UL grant in the uplink scheduling request response signal.

The UE calculates the RSR-RNTI according to the time-frequency resource where the uplink scheduling request signal is located (i.e., the scheduling request signal time-frequency resource selected by the UE), i.e., RSR-RNTI=initial_value+x_t*t_index+x_f*f_id, where t_index denotes the subframe number of the scheduling request signal time-frequency resource, 1≤t_index≤the maximum subframe number, and f_id denotes the frequency domain number of the scheduling request signal time-frequency resource.

When detecting the uplink scheduling request response signal in the PDCCH, the UE descrambles the uplink scheduling request response signal by the calculated RSR-RNTI.

(1) If, in block 1312, the UE descrambles and detects one uplink scheduling request response matched with the calculated RSR-RNTI, it acquires the PDSCH time-frequency resource position carried in the PDCCH, finds the PDSCH based on the PDSCH time-frequency resource position, and reads the content in the PDSCH.

a. If the UE reads its own UE unique identification number, it stops the detection and reads, in block 1312, the UL grant in the uplink scheduling request response; and b. if the UE does not read its own UE unique identification number, the UE is failed in the contention and in this case, the UE examines, in block 1316, the scheduling request transmission counter Count_sr. If, in block 1316, Count_sr<Count_sr_max, Count_sr=Count_sr+1 is set in block 1318, and an uplink scheduling request process is initiated again after the backoff time; and if Count_sr≥Count_sr_max, the retransmission of the uplink scheduling request is stopped, in block 1320, and a random access process is initiated for the uplink scheduling request.

(2) If the UE does not descramble and detect an uplink scheduling request response matched with the calculated RSR-RNTI, the UE is failed in the contention and in this case, the UE examines the scheduling request transmission counter Count_sr. If Count_sr<Count_sr_max, Count_sr=Count_sr+1 is set in block 1318, and an uplink scheduling request process is initiated again after the backoff time; and if Count_sr≥Count_sr_max, the retransmission of the uplink scheduling request is stopped, in block 1320, and a random access process is initiated for the uplink scheduling request.

The backoff time can be determined by finding the corresponding Backoff_time_value according to the set Backoff_Index, or one backoff time can be selected randomly or pseudo-randomly and at an equal probability from 0 to Backoff_time_value after the Backoff_time_value is found.

Embodiment 3

In this embodiment another uplink scheduling request process having two communicative interaction steps will be described. FIG. 14 is a schematic diagram of an uplink scheduling request process on the UE side according to this embodiment. The same parts in this embodiment as those in Embodiment 1 will not be repeated here. The difference between this embodiment and Embodiment 1 mainly UEs in that, in this embodiment, the uplink scheduling request response signal transmitted by the base station contains not only a UL grant but also timing advance information estimated by the base station. FIG. 15 shows comparison between the presence of timing advance information and the absence of timing advance information in the uplink scheduling request response signal. The timing advance information can be in form of timing advance new value TA_new, or in form of timing advance adjustment value TA_adjust.

When detecting the uplink scheduling request response signal, the UE descrambles the uplink scheduling request response signal in the PDCCH by its own C-RNTI.

If in block 1412 the UE descrambles and detects one uplink scheduling request response matched with its own C-RNTI, it stops the detection, reads the time-frequency resource position information of the PDSCH allocated by the base station, and finds the corresponding PDSCH by the time-frequency resource position information of the PDSCH so as to acquire the UL grant in block 1416. If, in block 1414, the UE also reads in block 1418 timing advance information, then: (1) if the timing advance information is a timing advance new value TA_new, the old timing advance value TA_old is replaced with the TA_new; and (2) if the timing advance information is a timing advance adjustment value TA_adjust, the old timing advance value TA_old is replaced with the TA_old+TA_adjust.

If in block 1412, the UE does not descramble and detect an uplink scheduling request response matched with its own C-RNTI, the UE is failed in the contention and in this case, in block 1420, the UE examines the scheduling request transmission counter Count_sr. If Count_sr<Count_sr_max, Count_sr=Count_sr+1 is set in block 1422, and an uplink scheduling request process is initiated again after the backoff time; and if Count_sr≥Count_sr_max, the retransmission of the uplink scheduling request is stopped in block 1424, and a random access process is initiated for the uplink scheduling request.

The backoff time can be determined by finding the corresponding Backoff_time_value according to the set Backoff_Index, or one backoff time can be selected randomly or pseudo-randomly and at an equal probability from 0 to Backoff_time_value after the Backoff_time_value is found.

Embodiment 4

Referring to FIG. 16, a process for completing an uplink scheduling request by four communicative interaction steps by combining a method for requesting uplink scheduling in the specific implementation and a method for responding to uplink scheduling request in the specific implementation will be described below. FIG. 17 is a schematic diagram of an uplink scheduling request process on the UE side according to this embodiment.

In this embodiment, in the first step, the UE transmits an uplink scheduling request signal, the uplink scheduling request signal containing a reference signal. In the second step, the base station searches for an uplink scheduling request signal in the configured time-frequency resource, detects the time-frequency resource where the reference signal and the uplink scheduling request signal are located, calculates the RSR-RNTI by using the detected time-frequency resource, scrambles the uplink scheduling request response signal by the RSR-RNTI, and transmits the scrambled uplink scheduling request response signal. The uplink scheduling request response signal contains an index of the detected reference signal and an Msg3 uplink transmission resource grant. In the third step, the UE calculates the RSR-RNTI by the time-frequency resource selected by the UE to transmit the uplink scheduling request signal, receives and descrambles the uplink scheduling request response signal by the RSR-RNTI to acquire the Msg3 uplink transmission resource grant, and transmits an Msg3 signal in the time-frequency resource specified by the Msg3 uplink transmission resource grant. The Msg3 signal contains the C-RNTI, BSR and PHR. In the fourth step, the base station receives the Msg3 signal, scrambles a conflict resolution signal by the C-RNTI in the Msg3 signal, and transmits the scrambled conflict resolution signal. The conflict resolution signal contains the UL grant. The UE receives and descrambles the conflict resolution signal by the C-RNTI to acquire the UL grant.

Step 501: The UE determines uplink scheduling request channel information in block 1702.

The UE selects, from scheduling request resources 1704, uplink scheduling request channel information for transmitting an uplink scheduling request. The scheduling request resource comprises:

(1) A set of scheduling request signal time-frequency resources. The scheduling request signal time-frequency resources are time-frequency resources for transmitting an uplink scheduling request signal. Part or all of scheduling request resources in the set of scheduling request signal time-frequency resources can be determined by downlink transmission beam information indicated by configuration information which is received by the UE in a broadcast message or PDCCH.

(2) A set of reference signals. The set of reference signals is a set of available reference signals in the uplink scheduling request signals. The reference signal can be a random access preamble sequence or an uplink data demodulation reference signal.

Particularly, between the reference signals and the scheduling request signal time-frequency resources, there can be the following mapping relations:

a. one scheduling request signal time-frequency resource corresponds to one reference signal;

b. one reference signal corresponds to N scheduling request signal time-frequency resources, where N is a positive integer greater than 1;

c. one scheduling request signal time-frequency resource corresponds to M reference signals, where M is a positive integer greater than 1.

Particularly, between the scheduling request signal time-frequency resources and the downlink transmission beam information, there can be the following mapping relations: the downlink transmission beam information can be an index of a downlink transmission beam or a downlink channel or signal that can determine a downlink transmission beam:

a. one scheduling request signal time-frequency resource corresponds to one piece of downlink transmission beam information;

b. one piece of downlink transmission beam information corresponds to N' scheduling request signal time-frequency resources, where N' is a positive integer greater than 1;

c. one scheduling request signal time-frequency resource corresponds to M' pieces of downlink transmission beam information, where M' is a positive integer greater than 1.

(3) Reference signal power ramp factor P_rsramp.

(4) Payload power ramp factor P_dpramp. The payload power ramp factor and the reference signal power ramp factor can be identical, i.e., P_dpramp=P_rsramp=P_ramp.

(5) Initial reference signal target received power P_isrrs.

(6) Initial payload target received power P_isrdp. The initial payload target received power and the initial reference signal target received power can be identical, i.e., P_isrdp=P_isrrs=P_isr.

(7) Reference signal response window size Size_rsrrsrw.

(8) Conflict resolution response window size Size_rsrcrrw.

(9) Maximum reference signal transmission count Count_srmsg1_max.

(10) Maximum payload transmission count Count_srmsg3_max.

(11) Values of initial_value, x_t and x_f, which are required for calculating the RSR-RNTI, where initial_value, x_t and x_f are all preset/pre-configured values, for example, initial_value=1, x_t=1, x_f=10.

(12) Backoff time set. The backoff time set may be in form of a look-up table. A backoff time index Backoff_Index is set. By constructing a table, a backoff time value Backoff_time_value is found according to the backoff time index Backoff_Index, as shown in Table 1.

Step 502: The UE initializes the scheduling request process in block 1706, and transmits, in block 1708 an uplink scheduling request signal generated according to the uplink scheduling request channel information to a base station.

In the connected state, the scheduling request process is initialized by an MAC layer or an RRC layer.

A reference signal transmission counter Count_srmsg1t is set as 1, i.e., Count_srmsg1t=1.

A payload transmission counter Count_srmsg3 is set as 1, i.e., Count_srmsg3=1.

The backoff time index Backoff_Index is set.

A scheduling request signal time-frequency resource and a reference signal are selected in the following way.

(1) if there is a mapping relation between the scheduling request signal time-frequency resources and the reference signals, then:

a. selecting one reference signal from the set of reference signals randomly or pseudo-randomly and at an equal probability, obtaining N scheduling request signal time-frequency resources based on the mapping relation in which one reference signal corresponds to N scheduling request signal time-frequency resources, and selecting one scheduling request signal time-frequency resource from the N scheduling request signal time-frequency resources randomly or pseudo-randomly and at an equal probability;

b. selecting one scheduling request signal time-frequency resource from the set of scheduling request signal time-frequency resources randomly or pseudo-randomly and at an equal probability, and obtaining M reference signals based on the mapping relation in which one scheduling request signal time-frequency resource corresponds to M reference signals, and selecting one reference signal from the M reference signals randomly or pseudo-randomly and at an equal probability;

c. selecting one reference signal from the set of reference signals randomly or pseudo-randomly and at an equal probability, and selecting one scheduling request signal time-frequency resource based on the mapping relation in which one reference signal corresponds to one scheduling request signal time-frequency resource;

d. selecting one scheduling request signal time-frequency resource from the set of scheduling request signal time-frequency resources randomly or pseudo-randomly and at an equal probability, and selecting one reference signal based on the mapping relation in which one scheduling request signal time-frequency resource corresponds to one reference signal;

e. determining a scheduling request signal time-frequency resource according to the dynamic configuration of the base station (i.e., configured by the PDCCH) (directly reading the dynamic configuration of the base station to determine a scheduling request signal time-frequency resource), or determining a scheduling request signal time-frequency resource according to the mapping relation between the downlink transmission beam information and the scheduling request signal time-frequency resources, and then selecting one reference signal based on the mapping relation in which one scheduling request signal time-frequency resource corresponds to one reference signal; and f. determining a user-specific reference signal according to the dynamic configuration of the base station (i.e., configured by the PDCCH), and selecting one scheduling request signal time-frequency resource based on the mapping relation in which one reference signal corresponds to one scheduling request signal time-frequency resource.

(2) If there is no mapping relation between the scheduling request signal time-frequency resources and the reference signals, then:

a. selecting one reference signal from the set of reference signals randomly or pseudo-randomly and at an equal probability;

b. selecting one scheduling request signal time-frequency resource from the set of scheduling request signal time-frequency resources randomly or pseudo-randomly and at an equal probability;

c. selecting a user-specific signal configured dynamically by the base station configured by the PDCCH) as a reference signal; and d. selecting a scheduling request signal time-frequency resource configured dynamically by the base station (i.e., configured by the PDCCH) as a scheduling request signal time-frequency resource.

A reference signal target received power P_srrs is set, i.e., P_srrs=P_isrrs=(Count_sr−1)*P_rsramp.

After determining the uplink scheduling request channel information such as the scheduling request signal time-frequency resource, the reference signal and the payload, the UE transmits an uplink scheduling request signal to the base station.

Step 503: The base station receives, in block 1710, the uplink scheduling request signal transmitted by the UE, and transmits an uplink scheduling request response signal.

Since the UE selects a scheduling request signal time-frequency resource or a reference signal from the preconfigured scheduling request resources to transmit the uplink scheduling request signal, contention occurs when a multiple of UEs select a same resource.

The base station serving the cell performs blind detection and decoding in the preconfigured set of time-frequency resources, receives the uplink scheduling request signal, contains the Msg3 uplink transmission resource grant and the index of the reference signal in the uplink scheduling request response signal, and transmits the uplink scheduling request response signal.

The base station calculates the RSR-RNTI according to the time-frequency resource where the received uplink scheduling request signal is located (i.e., the scheduling request signal time-frequency resource selected by the UE), i.e., RSR-RNTI=initial_value+x_t*t_index+x_f*f_id, where t_index denotes the subframe number of the scheduling request signal time-frequency resource, 1≤t_index≤the maximum subframe number, and f_id denotes the frequency domain number of the scheduling request signal time-frequency resource.

The uplink scheduling request response signal consists of two parts: data transmitted in the PDSCH, which at least comprises an Msg3 uplink transmission resource grant, an index of the detected reference signal and timing advance information; and the time-frequency resource position information of the PDSCH transmitted in the PDCCH. The base station allocates a PDSCH, and scrambles the Msg3 uplink transmission resource grant and the index of the reference signal by the calculated RSR-RNTI and then transmits them to the UE in the allocated PDSCH. Meanwhile, the base station transmits the time-frequency resource position of the allocated PDSCH to the UE by a PDCCH.

Step 504: The UE receives and decodes the uplink scheduling request response signal fed back by the base station, and acquires an Msg3 uplink transmission resource grant in the uplink scheduling request response signal.

Starting from the end subframe of the transmission of the uplink scheduling request signal plus X (for example, X=3) subframes, the LE detects whether there is any PDCCH carrying the uplink scheduling request response signal transmitted to this terminal within the configured Size_rsrrw (for example, Size_rsrrw=5) subframes. Particularly, the UE searches in a frequency domain of the Xth (for example, X=14) subframe behind a subframe in which the transmission of the uplink scheduling request signal is completed, and the value of the time domain is fixed. In this embodiment, in this way of searching, the complexity for the UE to search an uplink scheduling request response signal can be decreased. Other ways of searching can also be used in other embodiments.

The UE calculates the RSR-RNTI according to the time-frequency resource where the uplink scheduling request signal is located (i.e., the scheduling request signal time-frequency resource selected by the UE), i.e., RSR-RNTI=initial_value+x_t*t_index+x_f*f_id, where t_index denotes the subframe number of the scheduling request signal time-frequency resource, 1≤t_index≤the maximum subframe number, and f_id denotes the frequency domain number of the scheduling request signal time-frequency resource.

When detecting in the PDDCH, the UE descrambles the uplink scheduling request response signal by the calculated RSR-RNTI.

(1) If, in block 1712, the UE descrambles and detects one uplink scheduling request response matched with the calculated RSR-RNTI, it reads, in block 1714, the time-frequency resource position information of the PDSCH allocated by the base station, and finds the corresponding PDSCH by the time-frequency resource position information of the PDSCH so as to acquire the Msg3 uplink transmission resource grant.

And, the payload is configured. The payload contains the C-RNTI, BSR and PHR.

A payload target received power P_srdp is set, i.e., P_srdp=P_isrdp+(Count_sr−1)*P_dpramp.

(2) If, in block 1712 the UE does not descramble and detect an uplink scheduling request response matched with the calculated RSR-RNTI, the UE is failed in the contention and in this case, the UE examines, in block 1724, the reference signal transmission counter Count_srmsg1. If Count_srmsg1<Count_srmsg1_max, Count_srmsg1=Count_srmsg1+1 is set in block 1726, and an uplink scheduling request process is initiated again after the backoff time; and if Count_srmsg1≥Count_srmsg1_max, the retransmission of the uplink scheduling request is stopped in block 1728, and a random access process is initiated for the uplink scheduling request.

The backoff time can be determined by finding the corresponding Backoff_time_value according to the set Backoff_Index, or one backoff time can be selected randomly or pseudo-randomly and at an equal probability from 0 to Backoff_time_value after the Backoff_time_value is found.

Step 505: The UE in block 1714, determines Msg3 channel information according to the Msg3 uplink transmission resource grant, and transmits an Msg3 signal generated according to the Msg3 channel information to the base station.

The UE determines Msg3 channel information, such as the time-frequency resource for the Msg3 signal, according to the Msg3 uplink transmission resource grant. The Msg3 signal contains the payload configured in the step 504. The payload contains the C-RNTI, BSR and PHR.

Step 506: The base station receives the Msg3 signal transmitted by the UE, and transmits a conflict resolution signal.

Since there may be many UEs that have received and detected the uplink scheduling request response signal and those UEs will transmit an Msg3 signal in same time-frequency resource after acquiring an Msg3 uplink transmission resource grant from the uplink scheduling request response signal, accordingly, a contention will occur.

The base station serving the cell performs blind detection and decoding in the time-frequency resource specified by the Msg3 uplink transmission resource grant, receives the Msg3 signal in block 1716, acquires the C-RNTI, BSR and PHR in the uplink scheduling request signal, determines a UL grant (Uplink_grant) according to the BSR and PHR, contains the UL grant in a conflict resolution signal, scrambles the conflict resolution signal by the C-RNTI, and transmits the scrambled conflict resolution signal.

Step 507: The UE receives and decodes the conflict resolution signal fed back by the base station, and acquires the UL grant in the conflict resolution signal.

Starting from the end subframe of the transmission of the Msg3 signal plus Y (for example, Y=3) subframes, the UE detects whether there is any Physical Downlink Control Channel (PDCCH) carrying the conflict resolution signal transmitted to this terminal within the configured Size_rsrcrrw (for example, Size_rsrcrrw=5) subframes. Particularly, the UE searches in a frequency domain of the Yth (for example, Y=14) subframe behind a subframe in which the transmission of the Msg3 signal is completed, and the value of the time domain is fixed. In this embodiment, in this way of searching, the complexity for the UE to search an Msg3 signal can be decreased, Other ways of searching can also be used in other embodiments.

During the detection, the UE descrambles the conflict resolution signal by its own C-RNTI.

If, in block 1718 the UE descrambles and detects one conflict resolution signal matched with its own C-RNTI, the contention is resolved; and it stops the detection, reads the UL grant in the conflict resolution signal in block 1720.

If, in block 1718 the UE does not descramble and detect a conflict resolution signal matched with its own C-RNTI, the UE is failed in the contention and in this case, the UE examines the payload transmission counter Count_srmsg3 in block 1730. If Count_srmsg3<Count_srmsg3_max, Count_srmsg3=Count_srmsg3+1 is set in block 1714, and Msg3 is retransmitted after the backoff time; and if Count_srmsg3≥Count_srmsg3_max, the retransmission of Msg3 is sopped in block 1728, and a random access process is initiated for the uplink scheduling request.

The backoff time can be determined by finding the corresponding Backoff_time_value according to the set Backoff_Index, or one backoff time can be selected randomly or pseudo-randomly and at an equal probability from 0 to Backoff_time_value after the Backoff_time_value is found.

Embodiment 5

In this embodiment, an uplink scheduling request process that goes back to four communicative interaction steps (Embodiment 4) from two communicative interaction steps (Embodiment 1) gill be described. FIG. 18 is a schematic diagram of an uplink scheduling request process on the UE side according to this embodiment. The same parts in this embodiment as those in Embodiment 4 will not be repeated here. The difference between this embodiment and Embodiments 1 and 4 mainly UEs in that the base station determines the content contained in the uplink scheduling request response signal according to the detected content when receiving and detecting the uplink scheduling request signal transmitted by the UE, and further determines whether to perform an uplink scheduling request process that goes back to four communicative interaction steps (Embodiment 4) from two communicative interaction steps (Embodiment 1).

Step 601: The UE determines uplink scheduling request channel information in block 1802.

The UE selects, from scheduling request resources 1804, uplink scheduling request channel information for transmitting an uplink scheduling request. The scheduling request resource comprises:

(1) A set of scheduling request signal time-frequency resources. The scheduling request signal time-frequency resources are time-frequency resources for transmitting an uplink scheduling request signal. Part or all of scheduling request resources in the set of scheduling request signal time-frequency resources can be determined by downlink transmission beam information indicated by configuration information which is received by the UE in a broadcast message or PDCCH.

(2) A set of reference signals. The set of reference signals is a set of available reference signals in the uplink scheduling request signals. The reference signal can be a random access preamble sequence or an uplink data demodulation reference signal.

Particularly, between the reference signals and the scheduling request signal time-frequency resources, there can be the following mapping relations:

a. one scheduling request signal time-frequency resource corresponds to one reference signal;

b. one reference signal corresponds to N scheduling request signal time-frequency resources, where N is a positive integer greater than 1;

c. one scheduling request signal time-frequency resource corresponds to M reference signals, where M is a positive integer greater than 1.

Particularly, between the scheduling request signal time-frequency resources and the downlink transmission beam information, there can be the following mapping relations: the downlink transmission beam information can be an index of a downlink transmission beam or a downlink channel or signal that can determine a downlink transmission beam:

a. one scheduling request signal time-frequency resource corresponds to one piece of downlink transmission beam information;

b. one piece of downlink transmission beam information corresponds to N' scheduling request signal time-frequency resources, where N' is a positive integer greater than 1;

c. one scheduling request signal time-frequency resource corresponds to M' pieces of downlink transmission beam information, where M' is a positive integer greater than 1.

(3) Reference signal power ramp factor P_rsramp.

(4) Payload power ramp factor P_dpramp. The payload power ramp factor and the reference signal power ramp factor can be identical, i.e., P_dpramp=P_rsramp=P_ramp.

(5) Initial reference signal target received power P_isrrs.

(6) Initial payload target received power P_isrdp. The initial payload target received power and the initial reference signal target received power can be identical, i.e., P_isrdp=P_isrrs=P_isr.

(7) Reference signal response window size Size_rsrrsrw.

(8) Conflict resolution response window size Size_rsrcrw.

(9) Maximum scheduling request transmission count Count_sr_max.

(10) Maximum payload transmission count Count_srmsg3_max.

(11) Values of initial_value, x_t and x_f, which are required for calculating the RSR-RNTI, where initial_value, x_t and x_f are all preset/pre-configured values, for example, initial_value=1, x_t=1, x_f=10.

(12) Backoff time set. The backoff time set may be in form of a look-up table. A backoff time index Backoff_Index is set. By constructing a table, a backoff time value Backoff_time_value is found according to the backoff time index Backoff_Index, as shown in Table 1.

Step 602: The UE initializes the scheduling request process in block 1806, and transmits, in block 1808 an uplink scheduling request signal generated according to the uplink scheduling request channel information to a base station.

In the connected state, the scheduling request process is initialized by an MAC layer or an RRC layer.

A scheduling request transmission counter Count_sr is set as 1, i.e., Count_sr=1.

The backoff time index Backoff_Index is set.

A scheduling request signal time-frequency resource and a reference signal are selected in the following way.

(1) if there is a mapping relation between scheduling request signal time-frequency resources and the reference signals, then:

a. selecting one reference signal from the set of reference signals randomly or pseudo-randomly and at an equal probability, obtaining N scheduling request signal time-frequency resources based on the mapping relation in which one reference signal corresponds to N scheduling request signal time-frequency resources and selecting one scheduling request signal time-frequency resource from the N scheduling request signal time-frequency resources randomly or pseudo-randomly and at an equal probability;

b. selecting one scheduling request signal time-frequency resource from the set of scheduling request signal time-frequency resources randomly or pseudo-randomly and at an equal probability, and obtaining M reference signals based on the mapping relation in which one scheduling request signal time-frequency resource corresponds to M reference signals, and selecting one reference signal from the M reference signals randomly or pseudo-randomly and at an equal probability;

c. selecting one reference signal from the set of reference signals randomly or pseudo-randomly and at an equal probability, and selecting one scheduling request signal time-frequency resource based on the mapping relation in which one reference signal corresponds to one scheduling request signal time-frequency resource;

d. selecting one scheduling request signal time-frequency resource from the set of scheduling request signal time-frequency resources randomly or pseudo-randomly and at an equal probability, and selecting one reference signal based on the mapping relation in which one scheduling request signal time-frequency resource corresponds to one reference signal;

e. determining a scheduling request signal time-frequency resource according to the dynamic configuration of the base station (i.e., configured by the PDCCH) (directly reading the dynamic configuration of the base station to determine a scheduling request signal time-frequency resource), or determining a scheduling request signal time-frequency resource according to the mapping relation between the downlink transmission beam information and the scheduling request signal time-frequency resources, and then selecting one reference signal based on the mapping relation in which one scheduling request signal time-frequency resource corresponds to one reference signal;

f. determining a user-specific reference signal according to the dynamic configuration of the base station (i.e., configured by the PDCCH), and selecting one scheduling request signal time-frequency resource based on the mapping relation in which one reference signal corresponds to one scheduling request signal time-frequency resource.

(2) If there is no mapping relation between the scheduling request signal time-frequency resources and the reference signals, then:

a. selecting one reference signal from the set of reference signals randomly or pseudo-randomly and at an equal probability;

b. selecting one scheduling request signal time-frequency resource from the set of scheduling request signal time-frequency resources randomly or pseudo-randomly and at an equal probability;

c. selecting a user-specific signal configured dynamically by the base station (i.e., configured by the PDCCH) as a reference signal;

d. selecting a scheduling request signal time-frequency resource configured dynamically by the base station (i.e., configured by the PDCCH) as a scheduling request signal time-frequency resource.

And, the payload is configured. The payload contains the C-RNTI, BSR and PHR.

A reference signal target received power P_srrs is set, i.e., $P\_srrs=P\_isrrs+(Count\_sr-1)*P\_rsramp$.

A payload target received power P_srdp is set, $P\_srdp=P\_isrdp+(Count\_sr-1)*P\_dpramp$.

After determining the uplink scheduling request channel information such as the scheduling request signal time-frequency resource, the reference signal and the payload, the LTE transmits an uplink scheduling request signal to the base station.

Step 603: The base station receives, in block 1810, the uplink scheduling request signal transmitted by the UE, and transmits an uplink scheduling request response signal.

Since the UE selects a scheduling request signal time-frequency resource or a reference signal from the preconfigured scheduling request resources to transmit the uplink scheduling request signal, contention occurs when a multiple of UEs select a same resource.

The base station serving the cell performs blind detection and decoding in the preconfigured set of time-frequency resources, and receives the uplink scheduling request signal.

If in block 1812, the base station correctly detects both the reference signal and the payload in the uplink scheduling request signal, it determines in block 1814, a UL grant according to the BSR and PHR, and contains the UL grant, the C-RNTI and the index of the reference signal in the uplink scheduling request response signal.

If in block 1812, the base station correctly detects only the reference signal in the uplink scheduling request signal but does not detect the payload, in block 1816, it contains the Msg3 uplink transmission resource grant and the index of the reference signal in the uplink scheduling request response signal and transmits the uplink scheduling request response signal.

If the base station detects neither the reference signal nor the payload in the uplink scheduling request signal, it does not transmit the uplink scheduling request response signal.

The base station calculates the RSR-RNTI according to the time-frequency resource where the received uplink scheduling request signal is located (i.e., the scheduling request signal time-frequency resource selected by the UE), i.e., RSR-RNTI=initial_value+x_f*f_id, where t_index denotes the subframe number of the scheduling request signal time-frequency resource, 1≤index≤the maximum subframe number, and f_id denotes the frequency domain number of the scheduling request signal time-frequency resource.

The uplink scheduling request response signal consists of two parts: data transmitted in the PDSCH, at least comprises an Msg3 uplink transmission resource grant, an index of the detected reference signal and timing advance information; and the time-frequency resource position information of the PDSCH transmitted in the PDCCH. The base station allocates a PDSCH, and scrambles the PDCCH by the calculated RSR-RNTI and then transmits the scrambled PDCCH to the UE.

Step 604: The UE receives the uplink scheduling request response signal fed back by the base station, and acquires an uplink transmission resource grant in the uplink scheduling request response signal.

Starting from the end subframe of the transmission of the uplink scheduling request signal plus X (for example, X=3) subframes, the UE detects whether there is any PDCCH carrying the uplink scheduling request response signal transmitted to this terminal within the configured Size_rsrrw (for example, Size_rsrrw=5) subframes. Particularly, the UE searches in a frequency domain of the Xth (for example, X=14) subframe behind a subframe in which the transmission of the uplink scheduling request signal is completed, and the value of the time domain is fixed. In this embodiment, in this way of searching, the complexity for the UE to search an uplink scheduling request response signal can be decreased. Other ways of searching can also be used in other embodiments.

The UE calculates the RSR-RNTI according to the time-frequency resource where the uplink scheduling request signal is located (i.e., the scheduling request signal time-frequency resource selected by the UE), i.e., RSR-RNIT=initial_value+x_t*t_index+x_f*f_id, where t_index denotes the subframe number of the scheduling request signal time-frequency resource, 1≤t_index≤the maximum subframe number, and f_id denotes the frequency domain number of the scheduling request signal time-frequency resource.

When detecting in the PDCCH, the UE descrambles the uplink scheduling request response signal by the calculated RSR-RNTI.

(1) If the UE, descrambles and detects one uplink scheduling request response matched with the calculated RSR-RNTI, it reads the time-frequency resource position information of the PDSCH allocated by the base station, and finds the corresponding PDSCH by the time-frequency resource position information of the PDSCH so as to read the content of the uplink scheduling request response.

a. if the UE reads its own C-RNTI in block 1814, it stops the detection and reads the UL grant in the uplink scheduling request response; and b. if the UE reads neither its own C-RNTI nor the Msg3 uplink transmission resource grant, the UE examines, in block 1828, the scheduling request transmission counter Count_sr. If Count_sr<Count_sr_max, Count_sr=Count_sr+1 is set in block 1830, and an uplink scheduling request process is initiated again after the backoff time; and if Count_sr≥Count_sr_max, the retransmission of the uplink scheduling request is stopped in block 1832, and a random access process is initiated for the uplink scheduling request.

c. if the UE does not read its own C-RNTI but it reads the Msg3 uplink transmission resource grant, the process goes back to the uplink scheduling request process having four interaction steps.

And, the payload is configured. The payload contains the C-RNTI, BSR and PHR.

A payload target received power P_srdp is set, i.e., P_srdp=P_isrdp+(Count_sr−1)*P_dpramp.

A payload transmission counter Count_srmsg3 is set as 1, i.e., Count_srmsg3=Count_sr+1.

The subsequent steps 605 to 607 are executed.

(2) If the UE does not descramble and detect an uplink scheduling request response matched with the calculated RSR-RNTI, the UE examines the reference signal transmission counter Count_sr. If Count_sr<Count_sr_max, Count_sr=Count_sr+1 is set, and an uplink scheduling request process is initiated again after the backoff time; and if Count_sr≥Count_sr_max, the retransmission of the uplink scheduling request is stopped, and a random access process is initiated for the uplink scheduling request.

The backoff time can be determined by finding the corresponding Backoff_time_value according to the set Backoff_Index, or one backoff time can be selected randomly or pseudo-randomly and at an equal probability from 0 to Backoff_time_value after the Backoff_time_value is found.

The UE determines Msg3 channel information according to the Msg3 uplink transmission resource grant in block 1818, and transmits an Msg3 signal generated according to the Msg3 channel information to the base station in block 1820.

The LTE determines Msg3 channel information, such as the time-frequency resource for the Msg3 signal, according to the Msg3 uplink transmission resource grant. The Msg3 signal contains the payload configured in the step 604, The payload contains the C-RNTI, BSR and PHR.

Step 606: The base station receives the Msg3 signal transmitted by the UE, and transmits a conflict resolution signal.

Since there may be many UEs that have received and detected the uplink scheduling request response signal and those UEs will transmit an Msg3 signal in a same time-frequency resource after acquiring an Msg3 uplink transmission resource grant from the uplink scheduling request response signal, accordingly, a contention will occur.

In block 1822, the base station serving the cell performs blind detection and decoding in the t resource specified by the Msg3 uplink transmission resource grant, receives the Msg3 signal, acquires the C-RNTI, BSR and PHR in the uplink scheduling request signal, determines a UL grant according to the BSR and PHR, contains the UL grant in a conflict resolution signal, scrambles the conflict resolution signal by the C-RNTI, and transmits the scrambled conflict resolution signal.

Step 607: The UE receives and decodes the conflict resolution signal fed back by the base station, and acquires the UL grant in the conflict resolution signal.

Starting from the end subframe of the transmission of the Msg3 signal plus Y (for example, Y=3) subframes, the UE detects whether there is any Physical Downlink Control Channel (PDCCH) carrying the conflict resolution signal transmitted to this terminal within the configured Size_rsr-crrw (for example, Size_rsrcrrw=5) subframes. Particularly, the UE searches in a frequency domain of the Yth (for example, Y=14) subframe behind a subframe in which the transmission of the Msg3 signal is completed, and the value of the time domain is fixed. In this embodiment, in this way of searching, the complexity for the UE to search an Msg3 signal can be decreased. Other ways of searching can also be used in other embodiments.

During the detection, the UE descrambles the conflict resolution signal by its own C-RNTI.

If, in block 1824, the UE descrambles and detects one conflict resolution signal matched with its own C-RNTI, the contention is resolved; and it stops the detection, reads the UL grant in the conflict resolution signal in block 1826.

If, in block 1824, the UE does not descramble and detect a conflict resolution signal matched with its own C-RNTI, the UE is failed in the contention and in this case, the UE examines the payload transmission counter Count_srmsg3 in block 1834. If Count_srmsg3<Count_srmsg3_max, Count_srmsg3=Count_srmsg3+1 is set in block 1818, and Msg3 is retransmitted after the backoff time; and if Count_srmsg3≥Count_srmsg3_max, the retransmission of Msg3 is sopped in block 1832, and a random access process is initiated for the uplink scheduling request.

The backoff time can be determined by finding the corresponding Backoff_time_value according to the set Backoff_Index, or one backoff time can be selected randomly or pseudo-randomly and at an equal probability from 0 to Backoff_time_value after the Backoff_time_value is found.

Embodiment 6

Referring to FIG. 19, a process for completing an uplink scheduling request by two communicative interaction steps by combining a method for requesting uplink scheduling in the specific implementation and a method for responding to uplink scheduling request in the specific implementation will be described below. The difference between this embodiment and Embodiment 1 mainly UEs in that, in Embodiment 1, the base station uses the C-RNTI in the uplink scheduling request signal as a criterion for conflict resolution, while in this embodiment, the base station uses the user-specific reference signal in the uplink scheduling request signal as a criterion for conflict resolution. The same parts in this embodiment as those in Embodiment 1 will not be repeated here. FIG. 20 is a schematic diagram of an uplink scheduling request process on the UE side according to this embodiment.

Step 701: The UE determines, in block 2002, uplink scheduling request channel information.

The UE determines, from scheduling request resources 2004, uplink scheduling request channel information for transmitting an uplink scheduling request. The scheduling request resource comprises:

(1) A set of scheduling request signal time-frequency resources. The scheduling request signal time-frequency resources are time-frequency resources for transmitting an uplink scheduling request signal. Here, the set of scheduling request signal time-frequency resources further comprises scheduling request signal time-frequency resources specified by the dynamic configuration of the base station. Part or all of scheduling request resources in the set of scheduling request signal time-frequency resources can be determined by downlink transmission beam information indicated by configuration information which is received by the UE in a broadcast message or PDCCH.

(2) A set of reference signals. The set of reference signals is a set of available reference signals in the uplink scheduling request signals. The reference signal can be a random access preamble sequence or an uplink data demodulation reference signal. Here, the set of reference signals further comprises the user-specific reference signal specified by the dynamic configuration of the base station. The user-specific reference signal is mainly configured for a user having a high priority, for example, a user requiring Ultra-Reliable and Low Latency Communications (URLLC), in order to avoid contention failure and thus to obtain an uplink grant quickly and reduce the latency.

Particularly, between the reference signals and the scheduling request signal time-frequency resources, there can be the following mapping relations:

a. one scheduling request signal time-frequency resource corresponds to one reference signal;

b. one reference signal corresponds to N scheduling request signal time-frequency resources, where N is a positive integer greater than 1;

c. one scheduling request signal time-frequency resource corresponds to M reference signals, where M is a positive integer greater than 1.

Particularly, between the scheduling request signal time-frequency resources and the downlink transmission beam information, there can be the following mapping relations: the downlink transmission beam information can be an index of a downlink transmission beam or a downlink channel or signal that can determine a downlink transmission beam:

a. one scheduling request signal time-frequency resource corresponds to one piece of downlink transmission beam information;

b. one piece of downlink transmission beam information corresponds to N' scheduling request signal time-frequency resources, where N' is a positive integer greater than 1;

c. one scheduling request signal time-frequency resource corresponds to M' pieces of downlink transmission beam information, where M' is a positive integer greater than 1.

(3) Reference signal power ramp factor P_rsramp.

(4) Optionally, payload power ramp factor P_dpramp. The payload power ramp factor and the reference signal power ramp factor can be identical, i.e., P_dpramp=P_rsramp=P_ramp.

(5) Initial reference signal target received power P_isrrs.

(6) Initial payload target received power P_isrdp. The initial payload target received power and the initial reference signal target received power can be identical, i.e., P_isrdp=P_isrrs=P_isr.

(7) Scheduling request response window size Size_rsrrw.

(8) Maximum scheduling request transmission count Count_sr_max.

(9) Backoff time set. The backoff time set may be in form of a look-up table. A backoff time index Backoff_Index is set. By constructing a table, a backoff time value Backoff_time_value is found according to the backoff time index Backoff_Index.

The UE initializes the scheduling request process in block 2006, and transmits, in block 2008 uplink scheduling request signal generated according to the uplink scheduling request channel information to a base station.

Optionally, the payload is configured. The payload can contain one or more of a UE identifier (for example, a C-RNTI or an S-TMSI, a random number), a BSR and a PHR.

Step 703: The base station receives, in block 2010, the uplink scheduling request signal transmitted by the UE, and transmits an uplink scheduling request response signal.

The base station serving the cell performs blind detection and decoding in the preconfigured set of time-frequency resources, receives the uplink scheduling request signal, and acquires the possible C-RNTI, BSR and PHR in the uplink scheduling request signal. If the reference signal in the uplink scheduling request signal, which is detected by the base station, is a user-specific reference signal dynamically configured for the UE by the base station the base station determines to feed back an uplink scheduling request response signal to the UE. When the uplink scheduling request comprises the BSR and PHR, the base station determines a grant (Uplink_grant) according to the BSR and PHR, and transmits an uplink scheduling request response signal; and when the uplink scheduling request does not comprise the BSR and PHR, the base station allocates an uplink grant to the user according to a configured data packet size. For example, if the base station detects the user-specific reference signal but is failed in the payload decoding, the base station can allocate one uplink resource to the user so that the user can transmit a data packet of a configured size.

The uplink scheduling request response signal consists of two parts: data transmitted in the Physical Downlink Shared Channel (PDSCH), which at least comprises a UL grant, an index of the detected reference signal and timing advance information; and the time-frequency resource position information of the PDSCH transmitted in the Physical Downlink Control Channel (PDCCH). The base station scrambles the PDCCH by the C-RNTI, and transmits the scrambled PDCCH to the UE.

Step 704: The UE receives the uplink scheduling request response signal fed back by the base station, and acquires a UL grant the uplink scheduling request response signal.

Referring to FIG. 21, the uplink scheduling request, user equipment in the specific implementation comprises:

a channel determining module 2105 configured to determine uplink scheduling request channel information;

a request transmitting module 2110 configured to transmit an uplink scheduling request signal generated according to the uplink scheduling request channel information to a base station, the uplink scheduling request signal containing UE identifier information; and a grant acquiring module 2115 configured to receive the uplink scheduling request response signal fed back by the base station, and acquire an uplink transmission resource grant in the uplink scheduling request response signal by using the UE identifier information.

The operations of the channel determining module, the request transmitting module and the grant acquiring module correspond to the steps 101, 102 and 103 of the method for requesting uplink scheduling in the specific implementation, respectively, and will not be repeated here.

Referring to FIG. 22, the uplink scheduling request response base station equipment in the specific implementation comprises:

a request receiving module configured to receive an uplink scheduling request signal generated by a UE according to uplink scheduling request channel information, the uplink scheduling request channel signal containing UE identifier information; and a response transmitting module configured to transmit an uplink scheduling request response signal for the uplink scheduling request signal to the UE to enable the UE to acquire an uplink transmission resource grant in the uplink scheduling request response signal The operations of the request receiving module 2201 and the response transmitting module 2202 correspond to the steps 601 and 602 of the method for responding to uplink scheduling request in the specific implementation, respectively, and will not be repeated here.

It can be known from the description of the specific implementation that, compared with the prior art, the specific implementation at least has the following beneficial effects.

(1) in view of the characteristics of the RRC connected state, the step of acquiring a timing advance by the UE in the contention-based random access process is optimized and omitted, and the uplink scheduling request process may be completed by only two communicative interaction steps, leading to simple flow and high communication efficiency. Both the communication overhead and the service latency are significantly reduced, and the utilization efficiency of resources is improved.

(2) The base station is allowed to process the uplink scheduling request response by using different LE identifier information. When there is a or no one-to-one correspondence between the UE identifier information and lilts, different decisions for payloads and contention resolution can be designed for expansion according to different scenarios. This provides for good flexibility and extendibility.

(3) By improving the uplink scheduling request channel structure, guard interval and guard bandwidth used in the uplink scheduling request signal in traditional methods are reduced, and the spectrum utilization is improved.

(4) Configuring a scheduling request resource in the network configuration information and allowing a UE to select a resource to generate an uplink scheduling request signal according to the correspondence in the set of scheduling request resources by itself reduce the signaling and interaction overhead and increase the available scenarios when the UE is in different states.

(5) The UE takes a backoff retransmission policy when it is failed in the detection of a signal from the base station, and adjusts the transmission power during the retransmission. This increases the possibility of successfully acquiring the uplink transmission resource grant and improves the overall efficiency of the system.

(6) in Embodiment 2, the base station contains the UE unique identifier information (for example, C-RNTI) in the uplink scheduling request response signal and scrambles the uplink scheduling request response signal by a HE non-unique identifier (for example, RSR-RNTI), so that the UE has to complete both the two guarantees of descrambling and the UE unique identifier acknowledgement to acquire the uplink transmission resource grant. This improves the reliability of the uplink scheduling request.

(7) In Embodiment 3, combining the timing advance obtained by the UE into the uplink scheduling resource request process synchronously increases the scenarios to which the inventive method is applicable.

(8) In Embodiment 4, an uplink scheduling request scheme having four communicative interaction steps is provided, in which the UE transmits and determines a reference signal and then transmits a payload conflict resolution mode. This matches with the existing contention-based random access process. The application range of the inventive method is expanded.

(9) In Embodiment 5, a technical scheme in which the process goes back to four steps from two steps when the payload detection is failed is provided. This considers both the efficiency and the reliability of the system. The service latency is reduced, and the success possibility for the uplink scheduling request is greatly increased.

(10) In Embodiment 6, the base station uses the user-specific reference signal in the uplink scheduling request signal as a criterion for conflict resolution, so that a user having a high priority can obtain an uplink grant quickly. The service latency is reduced and the application scenarios of the system are expanded.

In the embodiments provided in the specific implementation, it should be understood that the disclosed system, device and method may be implemented in other ways. For example, the device embodiments described above are merely exemplary. For example, the division of the units is merely division of logical functions. There may be other division ways when in practical implementation, for example, many units or components may be combined together or may be integrated into another system, or some features may be omitted or not executed. In addition, the coupling or direct coupling or communicative connection as shown or discussed may be achieved by some interfaces, and the indirect coupling or communicative connection between the devices or units may be in electric, mechanical or other forms.

The units described as separated components may or may not be separated physically. Components, shown as units, may or may not be physical units, that is, they may be located in one place or distributed over a plurality of network units. Some or all of the units may be selected to implement the purpose of the solutions of the embodiment, as actual desired.

In addition, the functional units in the embodiments of the specific implementation may be integrated in one processing unit; or the functional units may be physically present as individual units; or two or more of the functional units may be integrated in one unit. The integrated units may be implemented in a form of hardware, or a form of software functional units.

Compared with the prior art, the present disclosure has, but is not limited to, the following technical effects:

First, in view of the characteristics of the RRC connected state, the step of acquiring a timing advance (TA) by the UE in the contention-based random access process is optimized and omitted, and the uplink scheduling request process may be completed by only two communicative interaction steps, leading to simple flow and high communication efficiency. Both the communication overhead and the service latency are significantly reduced, and the utilization efficiency of resources is improved.

Second, the base station is allowed to process the uplink scheduling request response by using different UE identifier information. When there is a or no one-to-one correspondence between the UE identifier information and UEs, different decisions for payloads and contention resolution can be designed for expansion according to different scenarios. This provides for good flexibility and extendibility.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a user equipment (UE) in a wireless communication system, the method comprising:
generating a signal for requesting an uplink scheduling based on information regarding a channel for an uplink scheduling request, wherein the signal includes information on an identifier of the UE;
transmitting, to a base station, the signal;
receiving, from the base station, a response signal including information regarding a resource grant for an uplink transmission, the resource grant corresponding to the identifier of the UE; and
identifying the resource grant by performing a backoff policy to acquire the resource grant,
wherein the response signal is scrambled by the base station using a scheduling request-radio network temporary identifier (SR-RNTI) which is obtained from a scheduling request signal time-frequency resource for the UE.

2. The method of claim 1, further comprising:
receiving, from the base station, configuration information through at least one of a physical broadcast channel (PBCH), physical downlink control channel (PDCCH), or physical downlink shared channel (PDSCH); and
determining the information regarding the channel for the uplink scheduling request based on a scheduling request resource in the configuration information.

3. The method of claim 2, wherein, the scheduling request resource comprises:
a set of scheduling request signal time-frequency resources, at least part of the scheduling request signal time-frequency resources being determined by information regarding a downlink transmission beam, or
a set of reference signals comprising a user-specific reference signal, and
wherein the signal comprises the user-specific reference signal associated with the UE.

4. The method of claim 3, wherein at least one of the scheduling request signal time-frequency resources corresponds to at least one of the reference signals according to a mapping relation.

5. The method of claim 2, wherein the information regarding the channel for the uplink scheduling request comprises a reference signal, and the scheduling request signal time-frequency resource for the UE, and the identifier of the UE comprises the SR-RNTI,
wherein the signal is transmitted on the scheduling request signal time-frequency resource used for the UE,
wherein the receiving of the response signal comprises acquiring a message 3 uplink transmission resource grant in the response signal by using the identifier information, further comprising:
determining information regarding a channel for message 3 according to the message 3 uplink transmission resource grant and the scheduling request resource;
transmitting a message 3 signal generated according to the information regarding the channel for the message 3 to the base station, the message 3 signal comprising a cell-radio network temporary identifier (C-RNTI) of the UE; and
receiving a conflict resolution signal from the base station in response to the message 3 signal, and acquiring an uplink grant in the conflict resolution signal by using the C-RNTI of the UE.

6. A base station in a wireless communication system, the base station comprising:
a transceiver configured to receive, from a user equipment (UE), a signal for requesting an uplink scheduling, wherein the signal includes information on an identifier of the UE; and
at least one processor configured to:
generate a response signal including information regarding a resource grant for an uplink transmission based on the identifier of the UE, wherein the resource grant is identified by performing a backoff policy to acquire the resource grant, and
determine a scheduling request-radio network temporary identifier (SR-RNTI) based on a scheduling request signal time-frequency resource for the UE, wherein the response signal scrambled by the SR-RNTI,
wherein the transceiver is further configured to transmit, to the UE, the response signal.

7. The base station of claim 6, wherein the transceiver is further configured to transmit, to the UE, configuration information through at least one of a physical broadcast channel (PBCH), physical downlink control channel (PDCCH), or physical downlink shared channel (PDSCH),
wherein the configuration information comprises a scheduling request resource for the signal.

8. The base station of claim 7, wherein, the configuration information comprises a user-specific reference signal, and
wherein the at least one processor is further configured to determine whether the user-specific reference signal is included in the signal, and
wherein the transceiver is further configured to transmit, to the UE, the response signal if the user-specific reference signal is included in the signal.

9. The base station of claim 7, wherein the scheduling request resource comprises the scheduling request signal time-frequency resource for the UE,
wherein the signal is transmitted through the scheduling request signal time-frequency resource for the UE.

10. The base station of claim 6, wherein the transceiver is further configured to:
receive, from the UE, a message 3 signal, the message 3 signal comprising a cell-radio network temporary identifier (C-RNTI) of the UE, and
transmit a conflict resolution signal for the message 3 signal,
wherein the C-RNTI is used for the UE to acquire an uplink grant in a conflict resolution signal.

11. The base station of claim 6, wherein the transceiver is further configured to:
detect a reference signal and a payload in the received signal,
transmit, to the UE, the response signal, if the reference signal and the payload are detected, the response signal comprising an uplink grant, and
transmit, to the UE, the response signal, if the reference signal is detected and the payload is not detected, the response signal comprising a message 3 uplink transmission resource grant.

12. A user equipment (UE) in a wireless communication system, the UE comprising:
at least one processor configured to generate a signal for requesting an uplink scheduling based on information regarding a channel for an uplink scheduling request, wherein the signal includes information on an identifier of the UE; and
a transceiver configured to:
transmit, to a base station, the signal, and
receive, from the base station, a response signal including information regarding a resource grant for an uplink transmission, the resource grant corresponding to the identifier of the UE,
wherein the at least one processor is further configured to identify the resource grant by performing a backoff policy to acquire the resource grant, and
wherein the response signal is scrambled by the base station using a scheduling request-radio network temporary identifier (SR-RNTI) which is obtained from a scheduling request signal time-frequency resource for the UE.

13. The UE of claim 12, wherein the transceiver is further configured to receive, from the base station, configuration information through at least one of a physical broadcast channel (PBCH), physical downlink control channel (PDCCH), or physical downlink shared channel (PDSCH), and wherein the at least one processor is further configured to determine the information regarding the channel for the uplink scheduling request based on a scheduling request resource in the configuration information.

14. The UE of claim 13, wherein, the scheduling request resource comprises:
a set of scheduling request signal time-frequency resources, at least part of the scheduling request signal time-frequency resources being determined by information regarding a downlink transmission beam, or
a set of reference signals comprising a user-specific reference signal, and
wherein the signal comprises the user-specific reference signal associated with the UE.

15. The UE of claim 14, wherein at least one of the scheduling request signal time-frequency resources corresponds to at least one of the reference signals according to a mapping relation.

16. The UE of claim 13, wherein the information regarding the channel for the uplink scheduling request comprises a reference signal, and the scheduling request signal time-frequency resource for the UE, and the identifier of the UE comprises the SR-RNTI, wherein the signal is transmitted on the scheduling request signal time-frequency resource used for the UE,
wherein the at least one processor is further configured to:
acquire a message 3 uplink transmission resource grant in the response signal by using the identifier information, further comprising:
determine information regarding a channel for message 3 according to the message 3 uplink transmission resource grant and the scheduling request resource;
transmit a message 3 signal generated according to the information regarding the channel for the message 3 to the base station, the message 3 signal comprising a cell-radio network temporary identifier (C-RNTI) of the UE; and
receive a conflict resolution signal from the base station in response to the message 3 signal, and acquiring an uplink grant in the conflict resolution signal by using the C-RNTI of the UE.

* * * * *